US011895444B2

(12) United States Patent
Imamura et al.

(10) Patent No.: US 11,895,444 B2
(45) Date of Patent: Feb. 6, 2024

(54) CONTROL DEVICE, CONTROL METHOD, PROJECTION SYSTEM, AND CONTROL PROGRAM

(71) Applicant: FUJIFILM Corporation, Tokyo (JP)

(72) Inventors: Kenshi Imamura, Saitama (JP); Kazuyuki Itagaki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/852,804

(22) Filed: Jun. 29, 2022

(65) Prior Publication Data

US 2023/0031450 A1 Feb. 2, 2023

(30) Foreign Application Priority Data

Jul. 30, 2021 (JP) ................................. 2021-126129

(51) Int. Cl.
*H04N 9/31* (2006.01)
*G03B 21/26* (2006.01)
(52) U.S. Cl.
CPC ........... *H04N 9/3147* (2013.01); *G03B 21/26* (2013.01); *H04N 9/3179* (2013.01)
(58) Field of Classification Search
CPC .... G03B 21/006; G03B 21/008; G03B 21/26; G03B 21/28; G03B 21/147; G03B 21/2066; H04N 9/317; H04N 9/3147; H04N 9/3179; H04N 9/3185; H04N 9/3194
See application file for complete search history.

(56) References Cited

U.S. PATENT DOCUMENTS

| 11,477,422 | B2 * | 10/2022 | Masuda | G09G 5/10 |
| 2008/0266321 | A1 * | 10/2008 | Aufranc | H04N 9/3179 |
| | | | | 353/30 |
| 2012/0050698 | A1 | 3/2012 | Kotani | |
| 2015/0029465 | A1 | 1/2015 | Ishikawa et al. | |
| 2018/0232855 | A1 | 8/2018 | Fukui | |
| 2021/0152796 | A1 * | 5/2021 | Boud | H04N 9/3147 |
| 2021/0306604 | A1 * | 9/2021 | Kubota | H04N 9/3185 |
| 2022/0264063 | A1 * | 8/2022 | Inoue | G06F 3/042 |
| 2022/0368872 | A1 * | 11/2022 | Shishido | H04N 9/3147 |

FOREIGN PATENT DOCUMENTS

| JP | 2012-47849 A | 3/2012 |
| JP | 2015-26992 A | 2/2015 |
| JP | WO2016/204068 A1 | 4/2018 |

* cited by examiner

*Primary Examiner* — Sultan Chowdhury
(74) *Attorney, Agent, or Firm* — Birch, Stewart, Kolasch & Birch, LLP

(57) ABSTRACT

A control device of a projection system includes one or more projection apparatuses that project a first image including a plurality of marker images, and an imaging apparatus that captures at least a part of the first image, the control device includes a processor, and the processor is configured to perform a control of projecting a second image including a plurality of marker images from the projection apparatus based on a capturing result of at least the part of the first image by the imaging apparatus.

21 Claims, 27 Drawing Sheets

CONTROL DEVICE, CONTROL METHOD, PROJECTION SYSTEM, AND CONTROL PROGRAM

CROSS-REFERENCE TO RELATED APPLICATION

The present application claims priority under 35 U.S.C. § 119 to Japanese Patent Application No. 2021-126129, filed on Jul. 30, 2021. This Japanese Patent Application is hereby expressly incorporated by reference, in its entirety, into the present application.

BACKGROUND OF THE INVENTION

1. Field of the Invention

The present invention relates to a control device, a control method, a projection system, and a computer readable medium storing a control program.

2. Description of the Related Art

JP2015-026992A discloses capturing calibration projection images projected from a plurality of projectors separately in a plurality of regions by a camera and calculating various correction coefficients for performing registration, scale matching, distortion correction, brightness correction of an overlapping region, and the like for each projector.

JP2016-204068A1 discloses capturing a projection region of a projector separately in a plurality of regions in a partially overlapping manner and estimating a projective transformation matrix for connecting adjacent partial images to each other based on a captured image.

JP2012-047849A discloses, in stack projection, projecting overlapping test patterns at the same time and capturing the test patterns, projecting patterns obtained by changing a wavelength region such as R, and B or patterns obtained by changing polarization characteristics for each projector, and retrospectively separating the overlapping patterns.

SUMMARY OF THE INVENTION

One embodiment according to the disclosed technology provides a control device, a control method, a projection system, and a computer readable medium storing a control program that can easily adjust projection of a projection apparatus with respect to a wide projection range.

A control device according to an aspect of the present invention is a control device of a projection system including one or more projection apparatuses that project a first image including a plurality of marker images, and an imaging apparatus that captures at least a part of the first image, the control device comprising a processor, in which the processor is configured to perform a control of projecting a second image including a plurality of marker images from the projection apparatus based on a capturing result of at least the part of the first image by the imaging apparatus.

A control method according to another aspect of the present invention is a control method by a control device of a projection system including one or more projection apparatuses that project a first image including a plurality of marker images, and an imaging apparatus that captures at least a part of the first image, the control device including a processor, the control method comprising performing, by the processor, a control of projecting a second image including a plurality of marker images from the projection apparatus based on a capturing result of at least the part of the first image by the imaging apparatus.

A projection system according to still another aspect of the present invention is a projection system comprising one or more projection apparatuses that project a first image including a plurality of marker images, an imaging apparatus that captures at least a part of the first image, and a control device, in which the control device includes a processor, and the processor is configured to perform a control of projecting a second image including a plurality of marker images from the projection apparatus based on a capturing result of at least the part of the first image by the imaging apparatus.

A control program according to still another aspect of the present invention causes a processor of a control device of a projection system to execute a process, the projection system including one or more projection apparatuses that project a first image including a plurality of marker images, and an imaging apparatus that captures at least a part of the first image, the process comprising performing a control of projecting a second image including a plurality of marker images from the projection apparatus based on a capturing result of at least the part of the first image by the imaging apparatus.

According to the present invention, a control device, a control method, a projection system, and a control program that can easily adjust projection of a projection apparatus with respect to a wide projection range can be provided.

DESCRIPTION OF THE PREFERRED EMBODIMENTS

Hereinafter, an example of an embodiment of the present invention will be described with reference to the drawings.

EMBODIMENT

Projection System 100 of Embodiment

Figure 1:
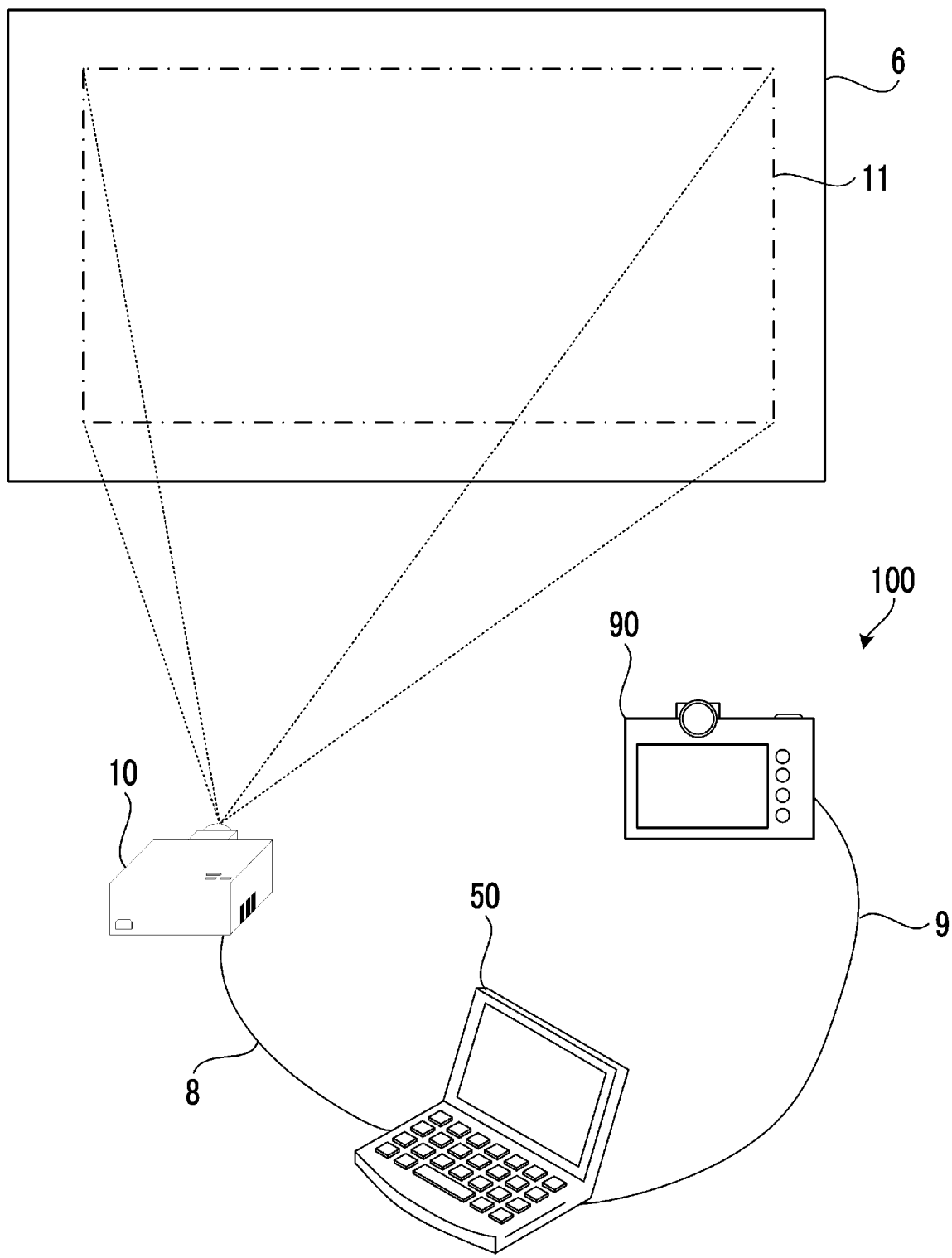
FIG. 1 is a diagram illustrating an example of a projection system 100 of an embodiment.

FIG. 1 is a diagram illustrating an example of a projection system 100 of the embodiment. As illustrated in FIG. 1, the projection system 100 comprises a projection apparatus 10, a computer 50, and an imaging apparatus 90. The computer 50 is an example of a control device according to the embodiment of the present invention.

The computer 50 can communicate with the projection apparatus 10 and the imaging apparatus 90. In the example illustrated in FIG. 1, the computer 50 is connected to the projection apparatus 10 through a communication cable 8 and can communicate with the projection apparatus 10. The computer 50 is connected to the imaging apparatus 90 through a communication cable 9 and can communicate with the imaging apparatus 90.

The projection apparatus 10 is a projection apparatus that can perform projection to a projection target object 6. The imaging apparatus 90 is an imaging apparatus that can capture an image projected to the projection target object 6 by the projection apparatus 10.

The projection target object 6 is an object such as a screen having a projection surface on which a projection image is displayed by the projection apparatus 10. In the example illustrated in FIG. 1, the projection surface of the projection target object 6 is a rectangular plane. It is assumed that upper, lower, left, and right sides of the projection target object 6 in FIG. 1 are upper, lower, left, and right sides of the actual projection target object 6.

A projection range 11 illustrated by a dot dashed line is a region that is irradiated with projection light by the projection apparatus 10 in the projection target object 6. In the example illustrated in FIG. 1, the projection range 11 is rectangular. The projection range 11 is a part or the entirety of a projectable range within which the projection can be performed by the projection apparatus 10.

Projection Apparatus 10

Figure 2:
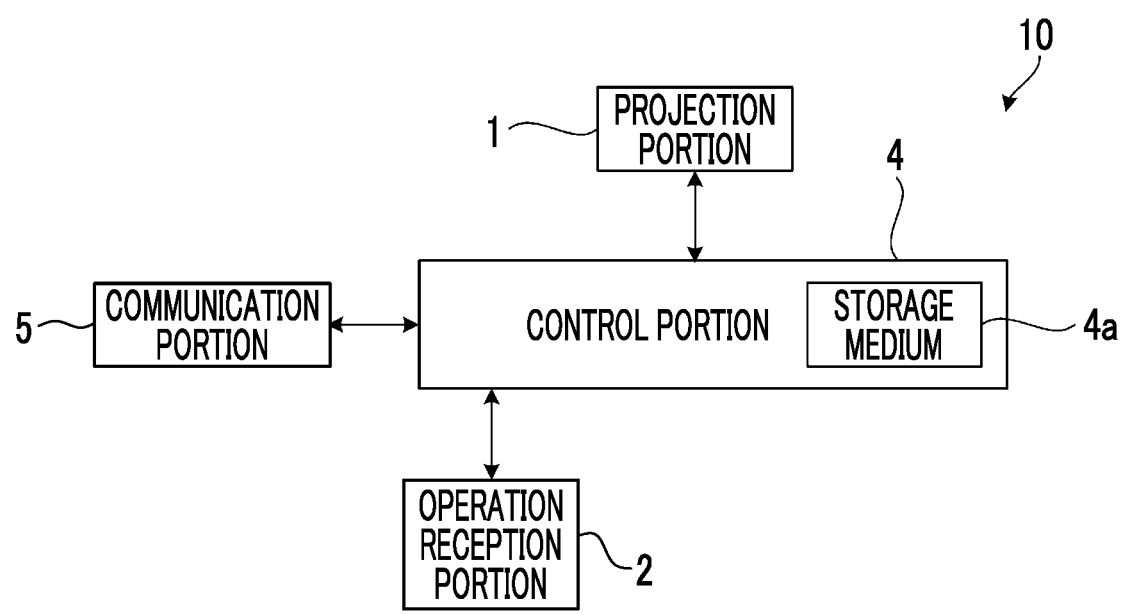
FIG. 2 is a diagram illustrating an example of a projection apparatus 10.

FIG. 2 is a diagram illustrating an example of the projection apparatus 10. As illustrated in FIG. 2, the projection apparatus 10 comprises a projection portion 1, a control portion 4, an operation reception portion 2, and a communication portion 5. The projection portion 1 is configured with, for example, a liquid crystal projector or a projector using liquid crystal on silicon (LCOS). Hereinafter, the projection portion 1 will be described as a liquid crystal projector.

The control portion 4 controls the projection performed by the projection apparatus 10. The control portion 4 is a device including a control portion configured with various processors, a communication interface (not illustrated) for communicating with each portion, and a storage medium 4a such as a hard disk, a solid state drive (SSD), or a read only memory (ROM) and generally controls the projection portion 1. Examples of the various processors of the control portion of the control portion 4 include a central processing unit (CPU) that is a general-purpose processor performing various processing by executing a program, a programmable logic device (PLD) such as a field programmable gate array (FPGA) that is a processor having a circuit configuration changeable after manufacturing, or a dedicated electric circuit such as an application specific integrated circuit (ASIC) that is a processor having a circuit configuration dedicatedly designed to execute specific processing.

More specifically, a structure of these various processors is an electric circuit in which circuit elements such as semiconductor elements are combined. The control portion of the control portion 4 may be configured with one of the various processors or may be configured with a combination of two or more processors of the same type or different types (for example, a combination of a plurality of FPGAs or a combination of a CPU and an FPGA).

The operation reception portion 2 detects an instruction (user instruction) from a user by receiving various operations from the user. The operation reception portion 2 may be a button, a key, a joystick, or the like provided in the control portion 4 or a reception portion or the like that receives a signal from a remote controller for remotely operating the control portion 4.

The communication portion 5 is a communication interface that can communicate with the computer 50. The communication portion 5 may be a wired communication interface that performs wired communication as illustrated in FIG. 1, or a wireless communication interface that performs wireless communication.

Figure 4:
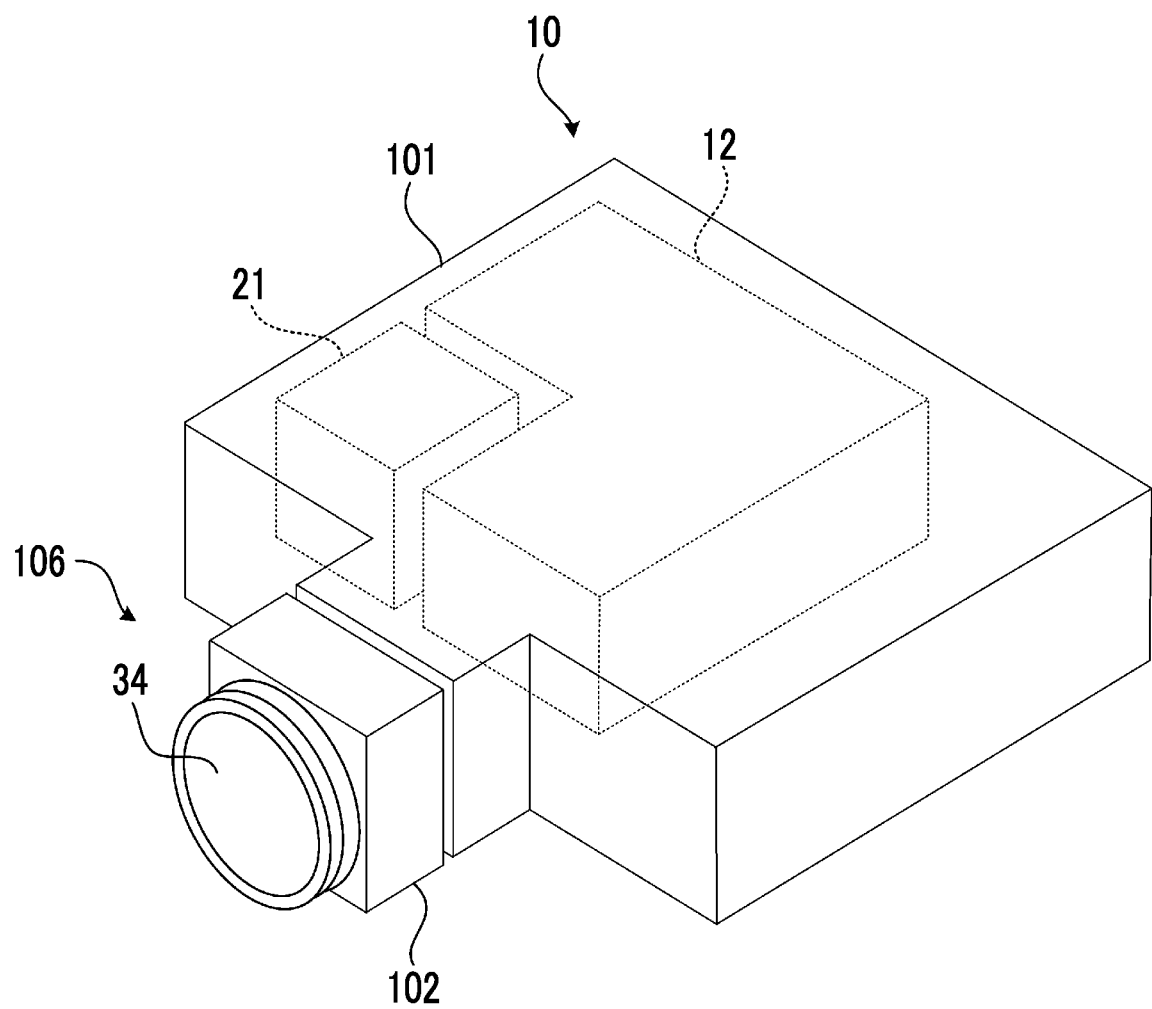
FIG. 4 is a schematic diagram illustrating an exterior configuration of the projection apparatus 10.
Figure 5:
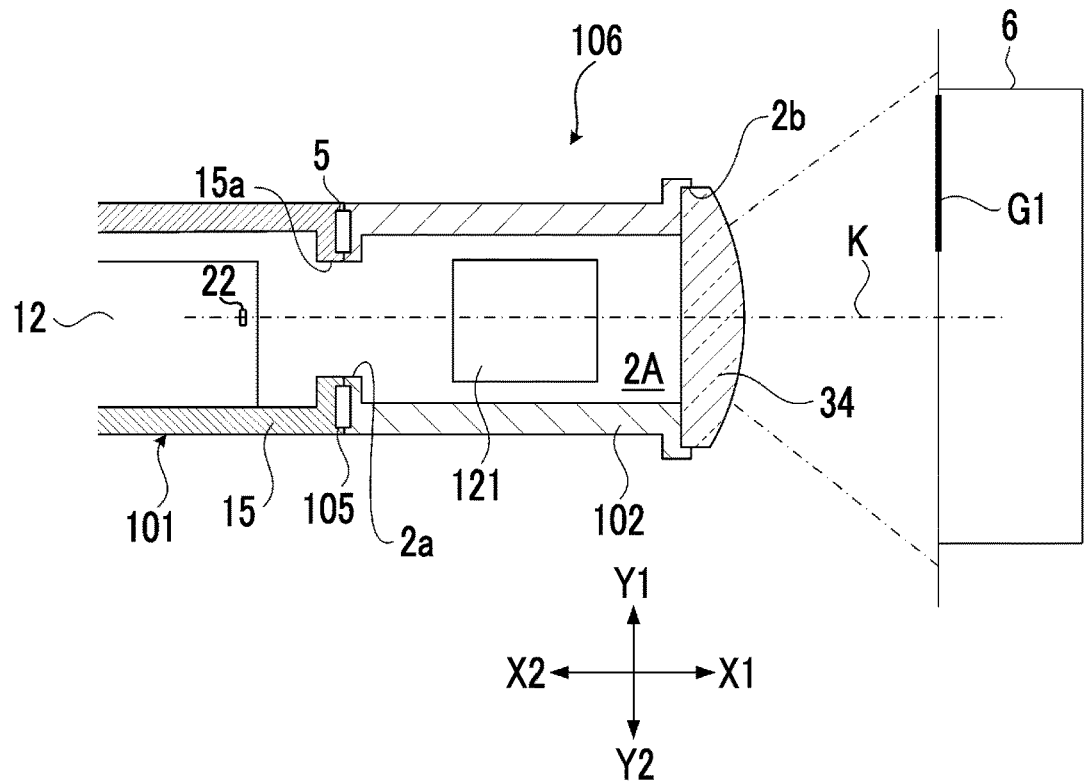
FIG. 5 is a schematic cross-sectional view of an optical unit 106 of the projection apparatus 10 illustrated in FIG. 4.

The projection portion 1, the control portion 4, and the operation reception portion 2 are implemented by, for example, one device (for example, refer to FIG. 4 and FIG. 5). Alternatively, the projection portion 1, the control portion 4, and the operation reception portion 2 may be separate devices that cooperate by communicating with each other.

Internal Configuration of Projection Portion 1

Figure 3:
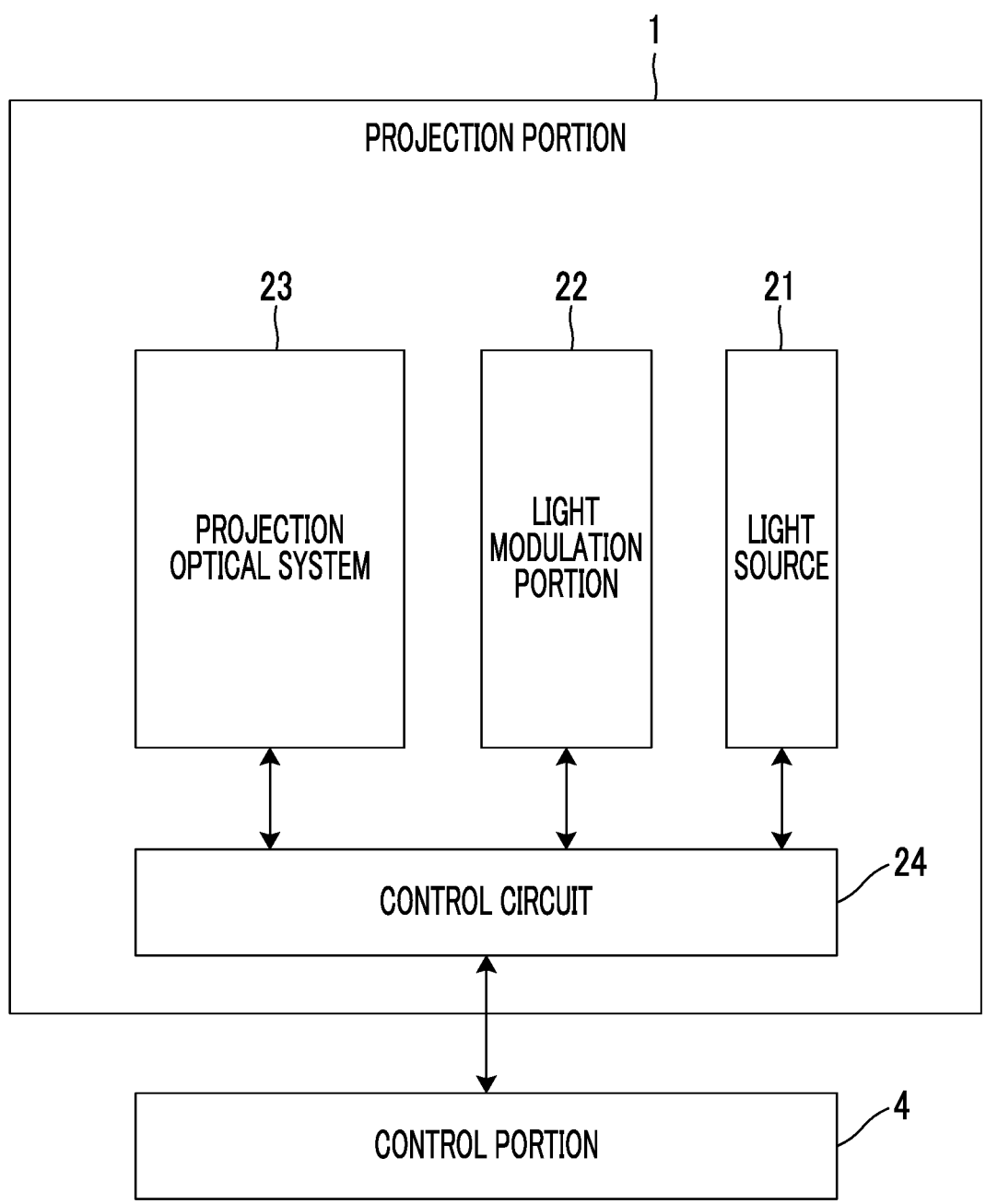
FIG. 3 is a schematic diagram illustrating an example of an internal configuration of a projection portion 1.

FIG. 3 is a schematic diagram illustrating an example of an internal configuration of the projection portion 1. As illustrated in FIG. 3, the projection portion 1 comprises a light source 21, a light modulation portion 22, a projection optical system 23, and a control circuit 24. The light source 21 includes a light emitting element such as a laser or a light emitting diode (LED) and emits, for example, white light.

The light modulation portion 22 is configured with three liquid crystal panels (light modulation elements) that emit each color image by modulating, based on image information, each color light which is emitted from the light source 21 and is separated into three colors of red, blue, and green by a color separation mechanism, not illustrated, and a dichroic prism that mixes each color image emitted from the three liquid crystal panels and emits the mixed color image in the same direction. Filters of red, blue, and green may be mounted in each of the three liquid crystal panels, and each color image may be emitted by modulating the white light emitted from the light source 21 in each liquid crystal panel.

The light from the light source 21 and the light modulation portion 22 is incident on the projection optical system 23. The projection optical system 23 includes at least one lens and is composed of, for example, a relay optical system. The light that has passed through the projection optical system 23 is projected to the projection target object 6.

In the projection target object 6, a region irradiated with the light transmitted through the entire range of the light modulation portion 22 is the projectable range within which the projection can be performed by the projection portion 1. In the projectable range, a region that is actually irradiated with the light transmitted through the light modulation portion 22 is the projection range 11. For example, in the projectable range, a size, a position, and a shape of the projection range 11 are changed by controlling a size, a position, and a shape of a region through which the light is transmitted in the light modulation portion 22.

The control circuit 24 projects an image based on display data to the projection target object 6 by controlling the light source 21, the light modulation portion 22, and the projection optical system 23 based on the display data input from the control portion 4. The display data input into the control circuit 24 is configured with three constituents of red display data, blue display data, and green display data.

In addition, the control circuit 24 enlarges or reduces the projection range 11 (refer to FIG. 1) of the projection portion 1 by changing the projection optical system 23 based on an instruction input from the control portion 4. In addition, the control portion 4 may move the projection range 11 of the projection portion 1 by changing the projection optical system 23 based on an operation received by the operation reception portion 2 from the user.

In addition, the projection apparatus 10 comprises a shift mechanism that mechanically or optically moves the projection range 11 while maintaining an image circle of the projection optical system 23. The image circle of the projection optical system 23 is a region in which the projection light incident on the projection optical system 23 appropriately passes through the projection optical system 23 in terms of a light fall-off, color separation, edge part curvature, or the like.

The shift mechanism is implemented by at least one of an optical system shift mechanism that performs optical system shifting, or an electronic shift mechanism that performs electronic shifting.

The optical system shift mechanism is, for example, a mechanism (for example, refer to FIG. 5 and FIG. 28) that moves the projection optical system 23 in a direction perpendicular to an optical axis, or a mechanism that moves the light modulation portion 22 in the direction perpendicular to the optical axis instead of moving the projection optical system 23. In addition, the optical system shift mechanism may perform the movement of the projection optical system 23 and the movement of the light modulation portion 22 in combination.

The electronic shift mechanism is a mechanism that performs pseudo shifting of the projection range 11 by changing a range through which the light is transmitted in the light modulation portion 22.

In addition, the projection apparatus 10 may comprise a projection direction changing mechanism that moves the image circle of the projection optical system 23 and the projection range 11. The projection direction changing mechanism is a mechanism that changes a projection direction of the projection portion 1 by changing a direction of the projection portion 1 by mechanical rotation (for example, refer to FIG. 28).

Mechanical Configuration of Projection Apparatus 10

FIG. 4 is a schematic diagram illustrating an exterior configuration of the projection apparatus 10. FIG. 5 is a schematic cross-sectional view of an optical unit 106 of the projection apparatus 10 illustrated in FIG. 4. FIG. 5 illustrates a cross section in a plane along an optical path of light emitted from a body part 101 illustrated in FIG. 4.

As illustrated in FIG. 4, the projection apparatus 10 comprises the body part 101 and the optical unit 106 that is provided to protrude from the body part 101. In the configuration illustrated in FIG. 4, the operation reception portion 2; the control portion 4; the light source 21, the light modulation portion 22, and the control circuit 24 in the projection portion 1; and the communication portion 5 are provided in the body part 101. The projection optical system 23 in the projection portion 1 is provided in the optical unit 106.

The optical unit 106 comprises a first member 102 supported by the body part 101. The optical unit 106 may be configured to be attachable to and detachable from the body part 101 (in other words, interchangeably configured).

As illustrated in FIG. 5, the body part 101 includes a housing 15 in which an opening 15a for passing light is formed in a part connected to the optical unit 106.

As illustrated in FIG. 4, the light source 21 and a light modulation unit 12 including the light modulation portion 22 (refer to FIG. 3) that generates an image by spatially modulating the light emitted from the light source 21 based on input image data are provided inside the housing 15 of the body part 101. The light emitted from the light source 21 is incident on the light modulation portion 22 of the light modulation unit 12 and is spatially modulated and emitted by the light modulation portion 22.

As illustrated in FIG. 5, the image formed by the light spatially modulated by the light modulation unit 12 is incident on the optical unit 106 through the opening 15a of the housing 15 and is projected to the projection target object 6. Accordingly, an image G1 is visible from an observer.

As illustrated in FIG. 5, the optical unit 106 comprises the first member 102 having a hollow portion 2A connected to an inside of the body part 101, a first optical system 121 arranged in the hollow portion 2A, a lens 34, and a first shift mechanism 105.

The first member 102 is a member having, for example, a rectangular cross-sectional exterior, in which an opening 2a and an opening 2b are formed in surfaces parallel to each other. The first member 102 is supported by the body part 101 in a state where the opening 2a is arranged at a position facing the opening 15a of the body part 101. The light emitted from the light modulation portion 22 of the light modulation unit 12 of the body part 101 is incident into the hollow portion 2A of the first member 102 through the opening 15a and the opening 2a.

An incidence direction of the light incident into the hollow portion 2A from the body part 101 will be referred to as a direction X1. A direction opposite to the direction X1 will be referred to as a direction X2. The direction X1 and the direction X2 will be collectively referred to as a direction X. In addition, in FIG. 5, a direction from the front to the back of the page and an opposite direction will be referred to as a direction Z. In the direction Z, the direction from the front to the back of the page will be referred to as a direction Z1, and the direction from the back to the front of the page will be referred to as a direction Z2.

In addition, a direction perpendicular to the direction X and the direction Z will be referred to as a direction Y. In the direction Y, an upward direction in FIG. 5 will be referred to as a direction Y1, and a downward direction in FIG. 5 will be referred to as a direction Y2. In the example in FIG. 5, the projection apparatus 10 is arranged such that the direction Y2 is a vertical direction.

The projection optical system 23 illustrated in FIG. 3 is composed of the first optical system 121 and the lens 34 in the example in FIG. 5. An optical axis K of this projection optical system 23 is illustrated in FIG. 5. The first optical system 121 and the lens 34 are arranged in this order from the light modulation portion 22 side along the optical axis K.

The first optical system 121 includes at least one lens and guides the light that is incident on the first member 102 from the body part 101 and travels in the direction X1, to the lens 34.

The lens 34 is arranged in an end part of the first member 102 on the direction X1 side in the form of closing the opening 2b formed in this end part. The lens 34 projects the light incident from the first optical system 121 to the projection target object 6.

The first shift mechanism 105 is a mechanism for moving the optical axis K of the projection optical system (in other words, the optical unit 106) in a direction (direction Y in FIG. 5) perpendicular to the optical axis K. Specifically, the first shift mechanism 105 is configured to be capable of changing a position of the first member 102 in the direction Y with respect to the body part 101. The first shift mechanism 105 may manually move the first member 102 or electrically move the first member 102.

FIG. 5 illustrates a state where the first member 102 is moved as far as possible to the direction Y1 side by the first shift mechanism 105. By moving the first member 102 in the direction Y2 by the first shift mechanism 105 from the state illustrated in FIG. 5, a relative position between a center of the image (in other words, a center of a display surface) formed by the light modulation portion 22 and the optical axis K changes, and the image G1 projected to the projection target object 6 can be shifted (translated) in the direction Y2.

The first shift mechanism 105 may be a mechanism that moves the light modulation portion 22 in the direction Y instead of moving the optical unit 106 in the direction Y. Even in this case, the image G1 projected to the projection target object 6 can be moved in the direction Y.

Hardware Configuration of Computer 50

Figure 6:
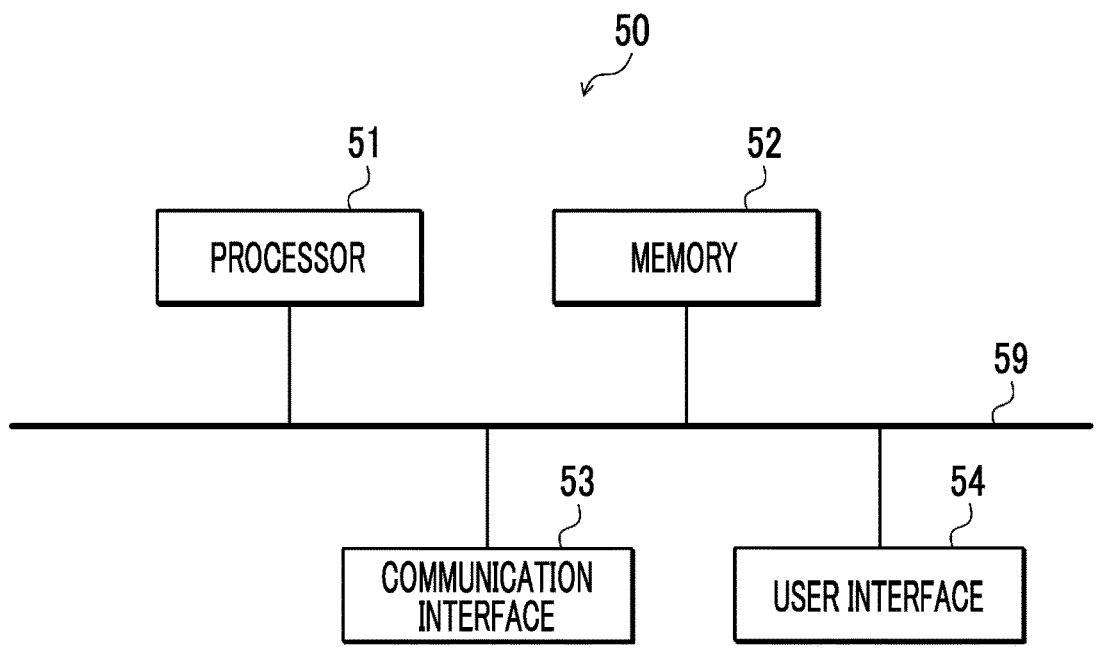
FIG. 6 is a diagram illustrating an example of a hardware configuration of a computer 50.

FIG. 6 is a diagram illustrating an example of a hardware configuration of the computer 50. As illustrated in FIG. 6, the computer 50 illustrated in FIG. 1 comprises a processor 51, a memory 52, a communication interface 53, and a user interface 54. For example, the processor 51, the memory 52, the communication interface 53, and the user interface 54 are connected by a bus 59.

For example, the processor 51 is a circuit performing signal processing and is a CPU that controls the entire computer 50. The processor 51 may be implemented by other digital circuits such as an FPGA and a digital signal processor (DSP). In addition, the processor 51 may be implemented by combining a plurality of digital circuits.

For example, the memory 52 includes a main memory and an auxiliary memory. For example, the main memory is a random access memory (RAM). The main memory is used as a work area of the processor 51.

For example, the auxiliary memory is a non-volatile memory such as a magnetic disk, an optical disc, or a flash memory. The auxiliary memory stores various programs for operating the computer 50. The programs stored in the auxiliary memory are loaded into the main memory and executed by the processor 51.

In addition, the auxiliary memory may include a portable memory that can be detached from the computer 50. Examples of the portable memory include a memory card such as a universal serial bus (USB) flash drive or a secure digital (SD) memory card and an external hard disk drive.

The communication interface 53 is a communication interface that communicates with an outside (for example, the projection apparatus 10 and the imaging apparatus 90) of the computer 50. The communication interface 53 is controlled by the processor 51. The communication interface 53 may be a wired communication interface that performs wired communication or a wireless communication interface that performs wireless communication or may include both of the wired communication interface and the wireless communication interface.

For example, the user interface 54 includes an input device that receives an operation input from a user, and an output device that outputs information to the user. For example, the input device can be implemented by a pointing device (for example, a mouse), a key (for example, a keyboard), or a remote controller. For example, the output device can be implemented by a display or a speaker. In addition, the input device and the output device may be implemented by a touch panel or the like. The user interface 54 is controlled by the processor 51.

Projection of First Image by Projection Apparatus 10 and Imageable Range of Imaging Apparatus 90

Figure 7:
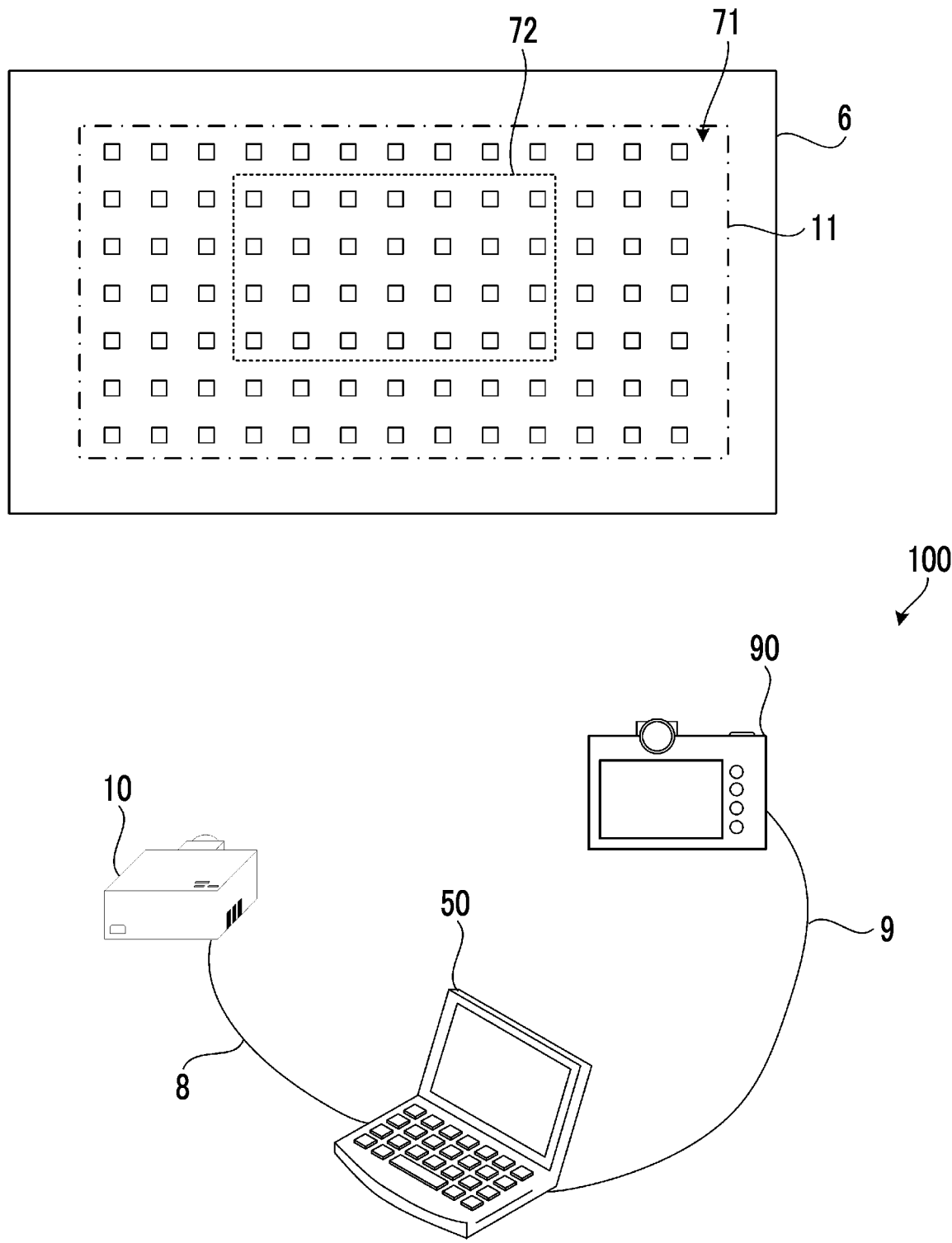
FIG. 7 is a diagram illustrating an example of projection of a first image by the projection apparatus 10 and an imageable range of an imaging apparatus 90.

FIG. 7 is a diagram illustrating an example of projection of a first image by the projection apparatus 10 and an imageable range of the imaging apparatus 90. As illustrated in FIG. 7, the computer 50 performs a control of projecting a first image 71 to the projection range 11 from the projection apparatus 10. The first image 71 is an image in which 91 rectangular marker images are arranged in a 7×13 matrix.

An imageable range 72 is a range that can be imaged by the imaging apparatus 90 in the projection target object 6. As illustrated in FIG. 7, the imageable range 72 may be narrower than the projection range 11, and the entire first image 71 may not be imageable by the imaging apparatus 90. For example, this is because of restrictions on an angle of view of the imaging apparatus 90 or restrictions on a distance in which the imaging apparatus 90 can be separated from the projection target object 6.

For example, the computer 50 performs a control of outputting a message that prompts a user of the imaging apparatus 90 to perform imaging by including as many marker images as possible among the marker images of the first image 71. The user of the imaging apparatus 90 may be the same as or different from the user of the computer 50.

The user of the imaging apparatus 90 captures at least a part of the first image 71 by the imaging apparatus 90. In the example in FIG. 7, it is assumed that the entire first image 71 cannot be captured by the imaging apparatus 90, and imaging is performed by causing a region that is a part near a center of the first image 71 and includes 4×7=28 marker images to fall within the imageable range 72. The imaging apparatus 90 transmits a captured image obtained by the imaging to the computer 50.

The computer 50 calculates the imageable range 72 based on the captured image transmitted from the imaging apparatus 90. Specifically, the calculation of the imageable range 72 is calculation of a relative size of the imageable range 72 with respect to the first image 71 projected to the projection target object 6. For example, the computer 50 calculates the number of marker images (in the example in FIG. 7, 28) included in the captured image from the imaging apparatus 90 among the marker images included in the first image 71 as the size of the imageable range 72. The computer 50 generates a second image including a plurality of marker images included in the imageable range 72 based on a calculation result of the imageable range 72.

For example, the computer 50 determines the number of marker images included in the captured image from the imaging apparatus 90 by image recognition. In the example in FIG. 7, 4×7=28 marker images are included in the captured image from the imaging apparatus 90. Accordingly, the computer 50 generates the second image including 4×7=28 marker images.

Projection of Second Images by Projection Apparatus 10

Figure 8:
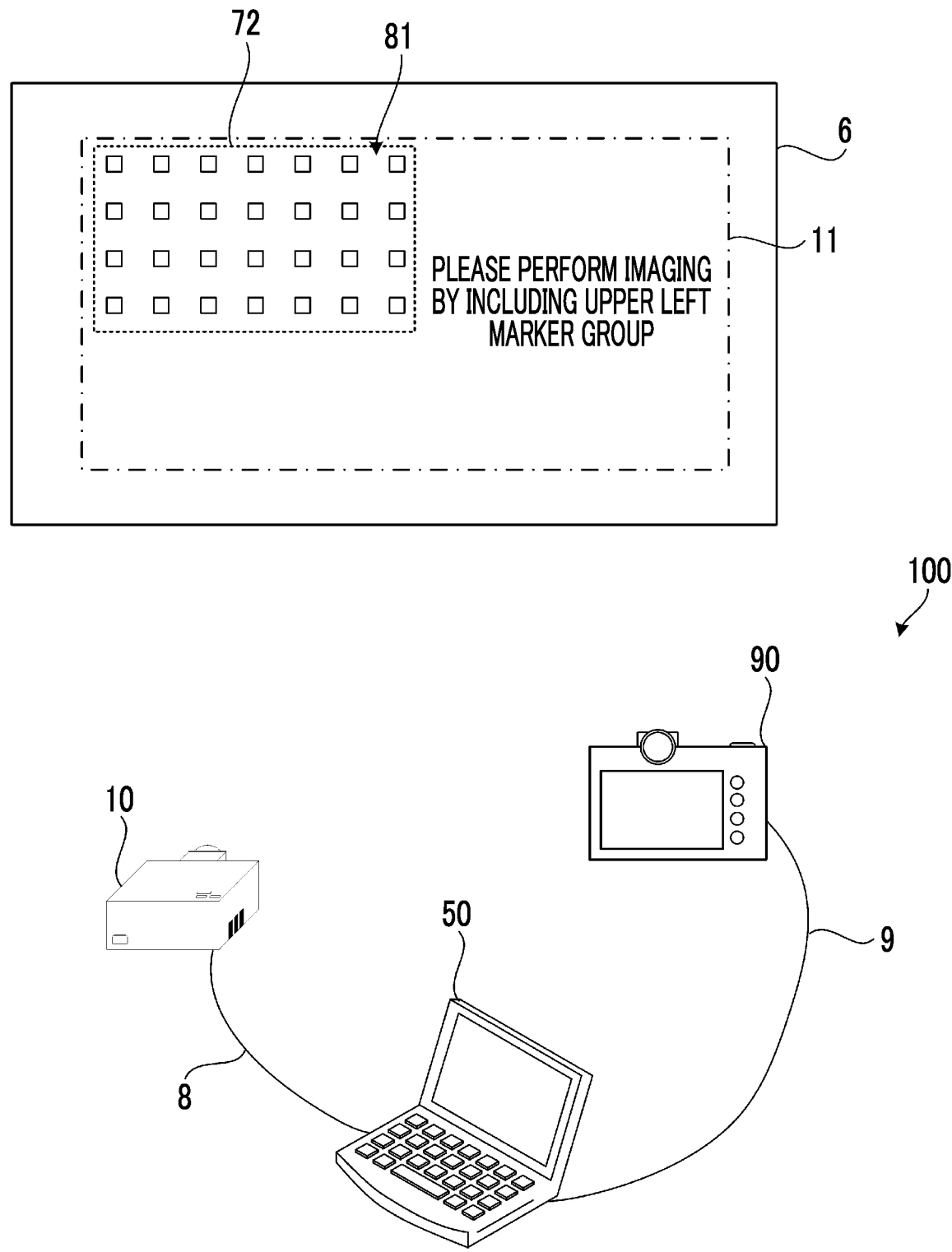
FIG. 8 is a diagram (Part 1) illustrating an example of projection of a second image by the projection apparatus 10.

FIG. 8 to FIG. 11 are diagrams illustrating projection of the second image by the projection apparatus 10. After the imageable range 72 is calculated as described using FIG. 7, for example, the computer 50 performs a control of projecting a second image 81 to an upper left part of the projection range 11 from the projection apparatus 10 as illustrated in FIG. 8.

The second image 81 is obtained by extracting an upper left part of 4×7=28 marker images from the first image 71. That is, the second image 81 is an image in which 28 rectangular marker images are arranged in a 4×7 matrix. In addition, sizes and intervals of the marker images included in the second image 81 are the same as sizes and intervals of the marker images included in the first image 71. Accordingly, the user of the imaging apparatus 90 can perform the imaging by the imaging apparatus 90 by causing the 28 marker images included in the second image 81 to fall within the imageable range 72. The imaging apparatus 90 transmits a captured image of the second image 81 obtained by the imaging to the computer 50.

In the state illustrated in FIG. 8, the computer 50 may perform a control of prompting the user of the imaging apparatus 90 to perform the imaging by including all marker images of the second image 81. In the example in FIG. 8, the computer 50 projects a message "Please perform imaging by including upper left marker group" to a different position from the second image 81 in the projection range 11 by controlling the projection apparatus 10.

Figure 9:
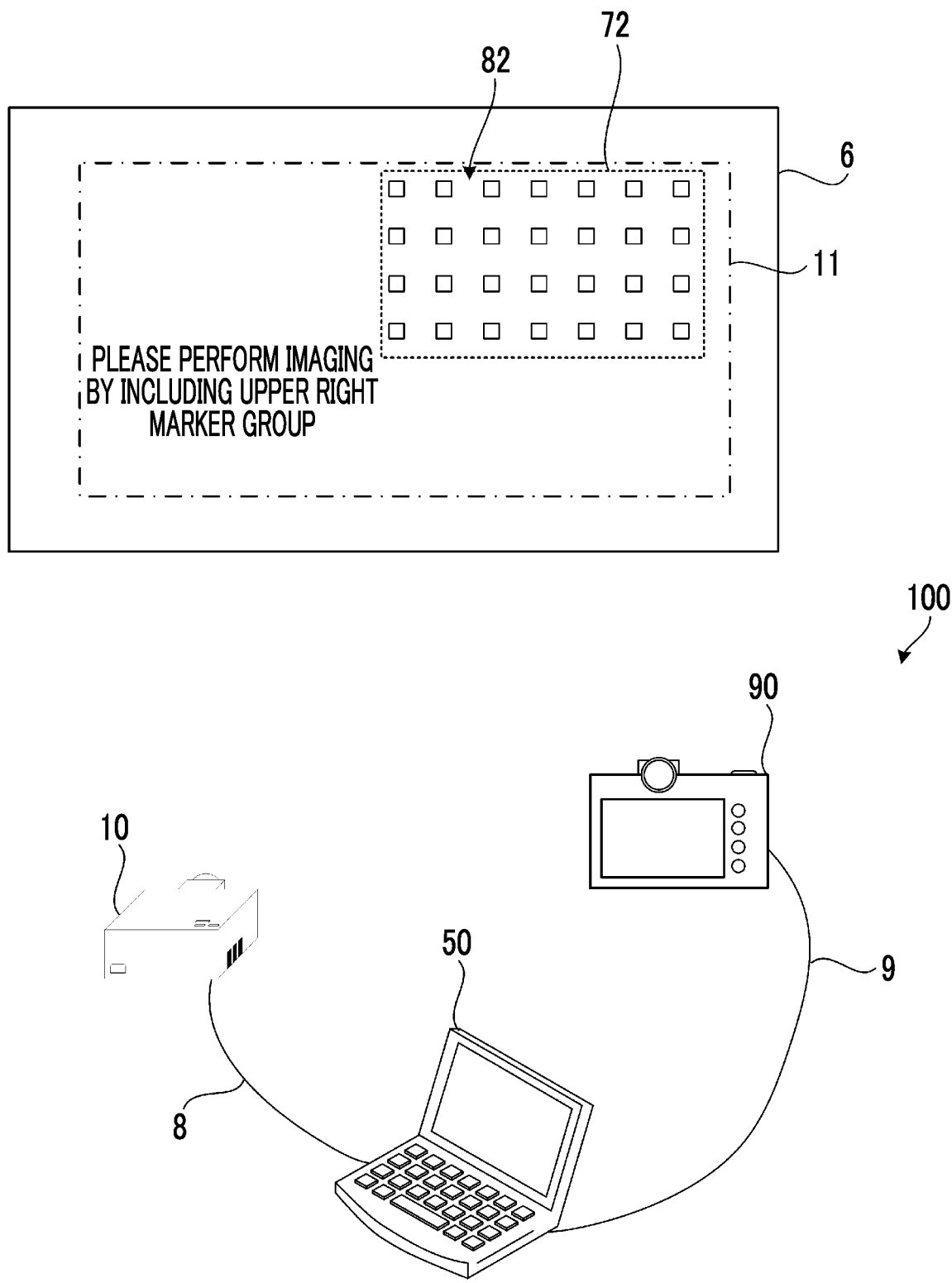
FIG. 9 is a diagram (Part 2) illustrating the example of projection of the second image by the projection apparatus 10.

Next, for example, as illustrated in FIG. 9, the computer 50 performs a control of projecting the second image 82 to an upper right part of the projection range 11 from the projection apparatus 10. A second image 82 is obtained by extracting an upper right part of 4×7=28 marker images from the first image 71. That is, the second image 82 is an image in which 28 rectangular marker images are arranged in a 4×7 matrix in the same manner as the second image 81. Accordingly, the user of the imaging apparatus 90 can perform the imaging by the imaging apparatus 90 by causing the 28 marker images included in the second image 82 to fall within the imageable range 72. The imaging apparatus 90 transmits a captured image of the second image 82 obtained by the imaging to the computer 50.

In the state illustrated in FIG. 9, the computer 50 may perform a control of prompting the user of the imaging apparatus 90 to perform the imaging by including all marker images of the second image 82. In the example in FIG. 9, the computer 50 projects a message "Please perform imaging by including upper right marker group" to a different position from the second image 82 in the projection range 11 by controlling the projection apparatus 10.

Figure 10:
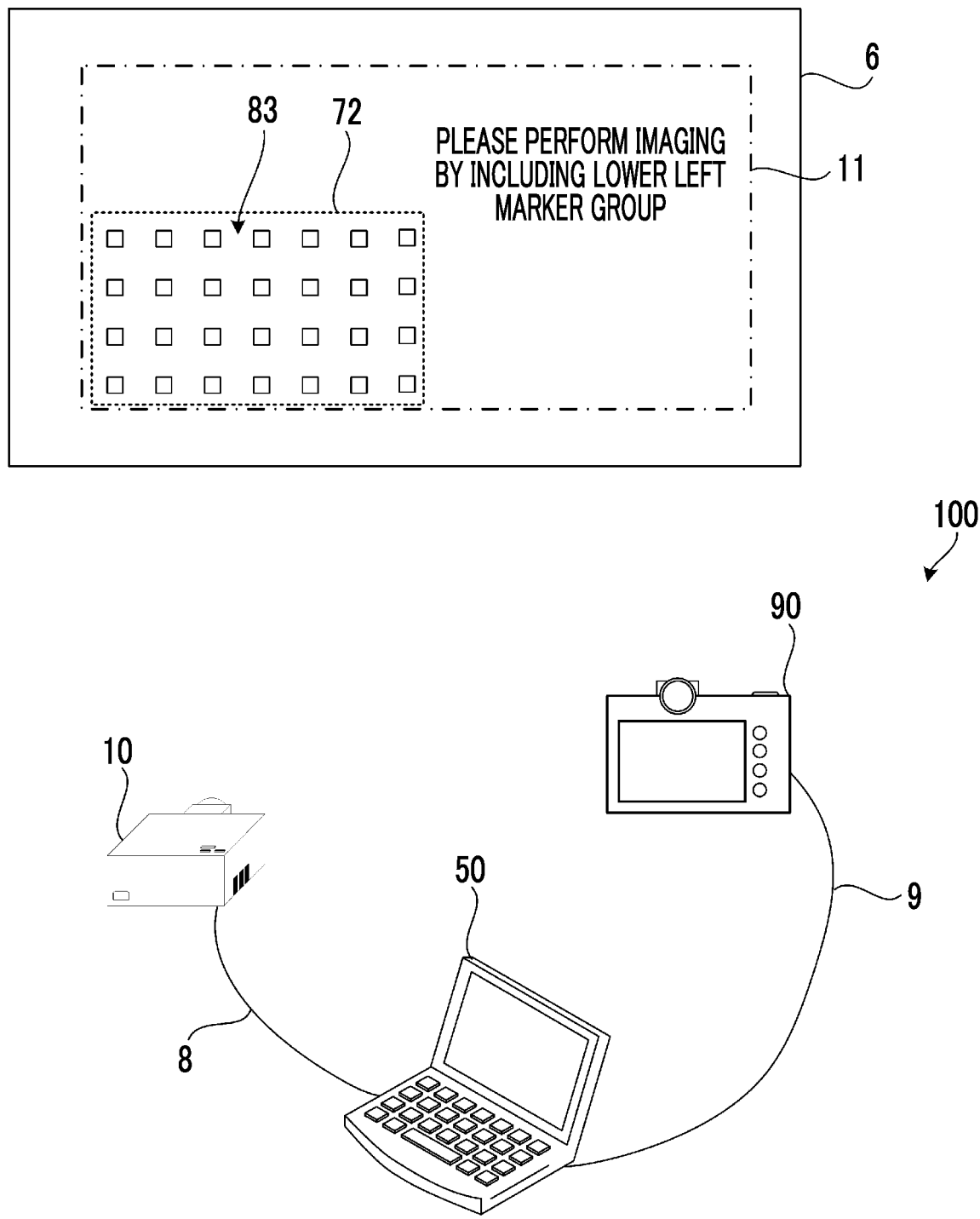
FIG. 10 is a diagram (Part 3) illustrating the example of projection of the second image by the projection apparatus 10.

Next, for example, as illustrated in FIG. 10, the computer 50 performs a control of projecting a second image 83 to a lower left part of the projection range 11 from the projection apparatus 10. The second image 83 is obtained by extracting a lower left part of 4×7=28 marker images from the first image 71. That is, the second image 83 is an image in which 28 rectangular marker images are arranged in a 4×7 matrix in the same manner as the second images 81 and 82. Accordingly, the user of the imaging apparatus 90 can perform the imaging by the imaging apparatus 90 by causing the 28 marker images included in the second image 83 to fall within the imageable range 72. The imaging apparatus 90 transmits a captured image of the second image 83 obtained by the imaging to the computer 50.

In the state illustrated in FIG. 10, the computer 50 may perform a control of prompting the user of the imaging apparatus 90 to perform the imaging by including all marker images of the second image 83. In the example in FIG. 10, the computer 50 projects a message "Please perform imaging by including lower left marker group" to a different position from the second image 83 in the projection range 11 by controlling the projection apparatus 10.

Figure 11:
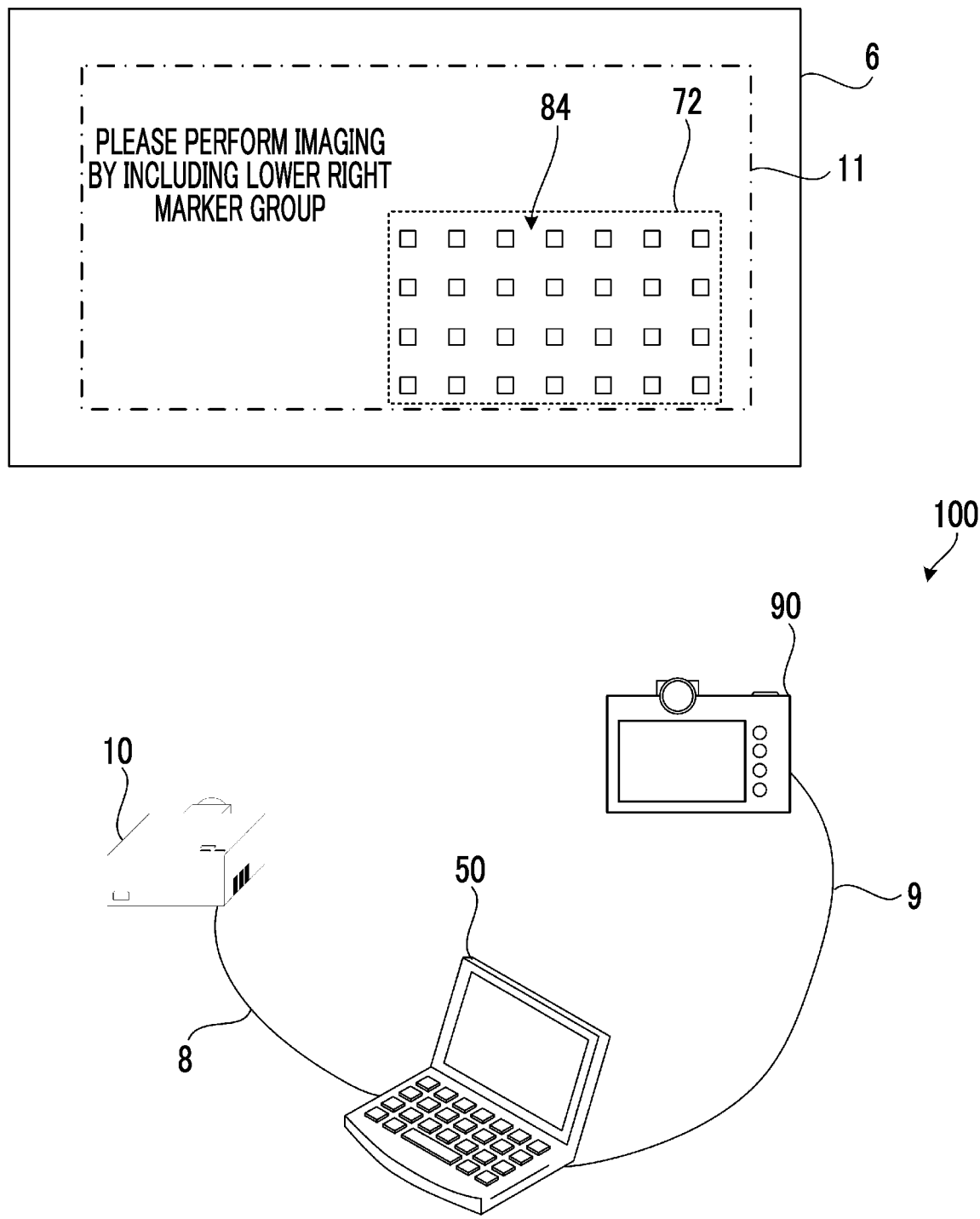
FIG. 11 is a diagram (Part 4) illustrating the example of projection of the second image by the projection apparatus 10.

Next, for example, as illustrated in FIG. 11, the computer 50 performs a control of projecting a second image 84 to a lower right part of the projection range 11 from the projection apparatus 10. The second image 84 is obtained by extracting a lower right part of 4×7=28 marker images from the first image 71. That is, the second image 84 is an image in which 28 rectangular marker images are arranged in a 4×7 matrix in the same manner as the second images 81 to 83. Accordingly, the user of the imaging apparatus 90 can perform the imaging by the imaging apparatus 90 by causing the 28 marker images included in the second image 84 to fall within the imageable range 72. The imaging apparatus 90 transmits a captured image of the second image 84 obtained by the imaging to the computer 50.

In the state illustrated in FIG. 11, the computer 50 may perform a control of prompting the user of the imaging apparatus 90 to perform the imaging by including all marker images of the second image 84. In the example in FIG. 11, the computer 50 projects a message "Please perform imaging by including lower right marker group" to a different position from the second image 84 in the projection range 11 by controlling the projection apparatus 10.

As described using FIG. 8 to FIG. 11, the computer 50 can obtain information equivalent to the captured image of the entire first image 71 by receiving the captured images of the second images 81 to 84 from the imaging apparatus 90. The computer 50 performs a control of adjusting the projection of the projection apparatus 10 based on the received captured images of the second images 81 to 84.

For example, the computer 50 generates an image equivalent to the captured image of the entire first image 71 by combining the received captured images of the second images 81 to 84. The computer 50 detects distortion of a projection image within the projection range 11 based on distortion in shape or arrangement of marker images included in the generated image and performs distortion correction of the projection image based on a detection result.

The computer 50 causes the imaging apparatus 90 to capture at least a part of the first image 71 by projecting the first image 71 including a plurality of marker images from the projection apparatus 10 and repeats the control of projecting the second image (for example, the second images 81 to 84) including a plurality of marker images from the projection apparatus 10 based on a capturing result.

Specifically, the computer 50 calculates the imageable range 72 of the imaging apparatus 90 based on a captured image of at least a part of the first image 71 and performs the control of projecting the second images 81 to 84 from the projection apparatus 10 based on the calculated imageable range 72. At this point, the computer 50 projects the second images 81 to 84 from the projection apparatus 10 while changing a projection position of each of the second images 81 to 84. The computer 50 performs the control of adjusting the projection of the projection apparatus 10 based on capturing results of the second images 81 to 84 by the imaging apparatus 90.

Accordingly, even in a case where the entire first image 71 projected to the projection range 11 cannot be captured by the imaging apparatus 90, the second images 81 to 84 that can be captured by the imaging apparatus 90 can be captured by the imaging apparatus 90 by projecting the second images 81 to 84, and the projection of the projection apparatus 10 can be adjusted based on the capturing results. Thus, the projection of the projection apparatus 10 with respect to a wide projection range 11 can be easily adjusted.

In addition, in repeating the control of projecting the second image from the projection apparatus 10, the projection apparatus 10 may perform a control of changing the second image projected from the projection apparatus 10. For example, the projection apparatus 10 may set the marker images included in the second image 81 as rectangles, set the marker images included in the second image 82 as circles, set the marker images included in the second image 83 as triangles, and set the marker images included in the second image 84 as x marks. Accordingly, in receiving the captured images of the second images 81 to 84 from the imaging apparatus 90, the computer 50 can securely determine to which of the second images 81 to 84 the received captured images correspond by determining the shapes of the marker images included in the received captured images.

While processing of performing the imaging by sequentially projecting the second images 81 to 84 is described, the present invention is not limited thereto. For example, the computer 50 may project only the second image 81 among the second images 81 to 84 from the projection apparatus 10. In this case, the computer 50 estimates the distortion of the projection image within the entire projection range 11 based on the distortion in shape or arrangement of the marker images included in the second image 81 and performs the distortion correction of the projection image based on an estimation result.

In addition, while a case where the second images 81 to 84 are obtained by extracting a part of the first image 71 is described, the second images 81 to 84 are not limited thereto. For example, in the examples illustrated in FIG. 7 to FIG. 11, the second images 81 to 84 may be images in which 28 circular or triangular marker images are arranged in a 4×7 matrix. In addition, the second images 81 to 84 may be images including marker images having different shapes or colors.

Processing by Computer 50

Figure 12:
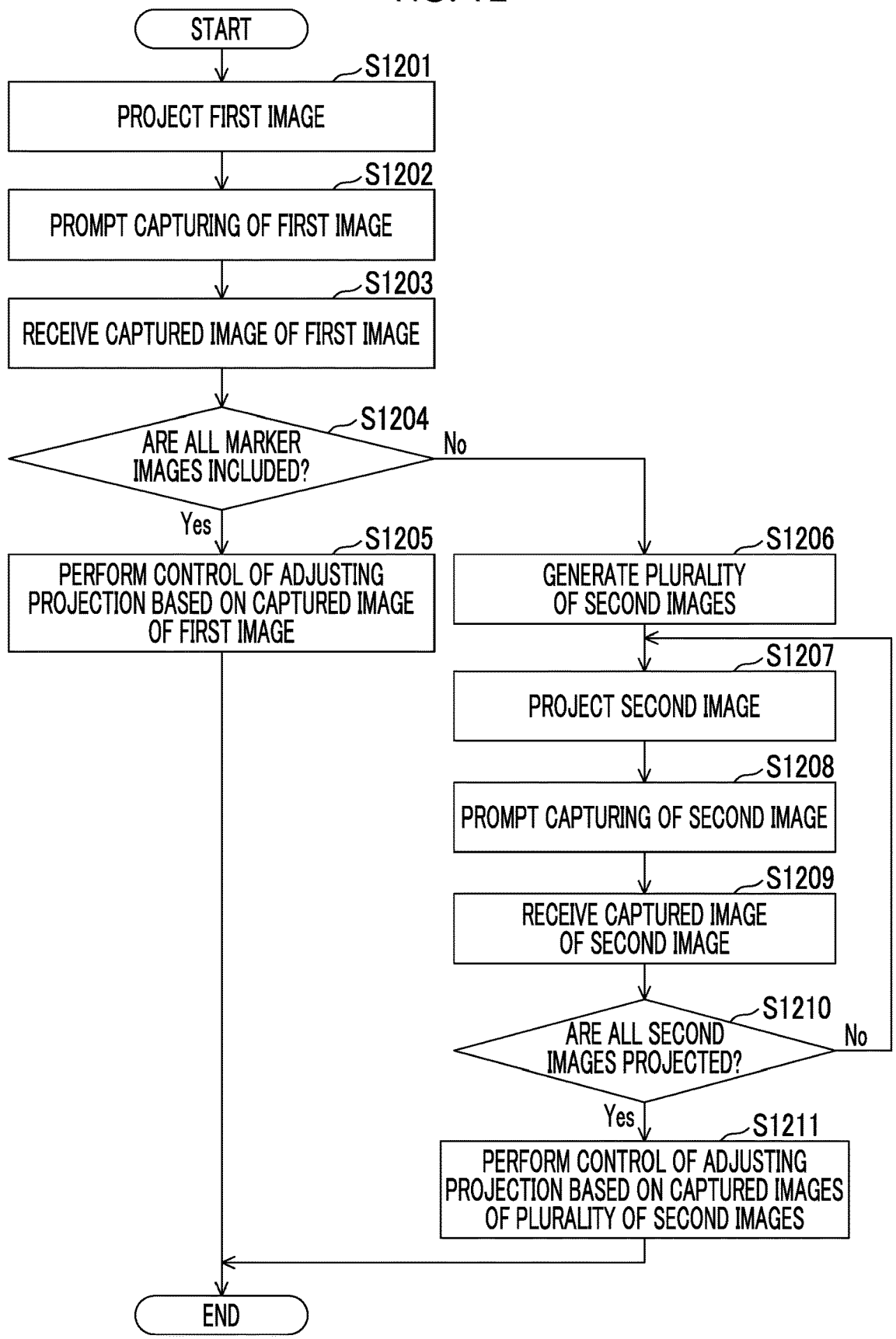
FIG. 12 is a flowchart illustrating an example of processing by the computer 50.

FIG. 12 is a flowchart illustrating an example of processing by the computer 50. For example, the computer 50 executes the processing illustrated in FIG. 12.

First, the computer 50 projects the first image 71 from the projection apparatus 10 by transmitting a control signal to the projection apparatus 10 (step S1201). For example, the computer 50 projects the first image 71 illustrated in FIG. 7 from the projection apparatus 10.

Next, the computer 50 performs the control of prompting the user of the imaging apparatus 90 to capture the first image 71 projected in step S1201 by the imaging apparatus 90 (step S1202). For example, this control is performed by controlling the projection apparatus 10 to project the message to the projection range 11.

Next, the computer 50 receives the captured image of the first image 71 obtained by the imaging prompted in step S1202 from the imaging apparatus 90 (step S1203). The transmission of the captured image by the imaging apparatus 90 may be automatically performed by the imaging apparatus 90 with the imaging of the imaging apparatus 90 as a trigger, or may be performed by a user operation after the imaging of the imaging apparatus 90.

Next, the computer 50 determines whether or not all marker images of the first image 71 are included in the captured image received in step S1203 (step S1204). In step S1204, in a case where all marker images are included (step S1204: Yes), the computer 50 performs the control of adjusting the projection of the projection apparatus 10 based on the captured image of the first image 71 received in step S1203 (step S1205) and finishes the series of processing.

In step S1204, in a case where at least any of the marker images is not included (step S1204: No), the computer 50 generates a plurality of second images (step S1206). For example, the computer 50 calculates the imageable range 72 based on the captured image of the first image 71 received in step S1203 and generates second images (for example, the second images 81 to 84) that can cover the projection range 11 based on the calculated imageable range 72.

Next, the computer 50 projects a non-projected second image from the projection apparatus 10 among the second images generated in step S1206 (step S1207). Next, the computer 50 performs the control of prompting the user of the imaging apparatus 90 to capture the second image projected in step S1207 by the imaging apparatus 90 (step S1208).

Next, the computer 50 receives the captured image of the second image obtained by the imaging prompted in step S1208 from the imaging apparatus 90 (step S1209). Next, the computer 50 determines whether or not all second images generated in step S1206 are completely projected in step S1207 (step S1210).

In step S1210, in a case where at least any of the second images is not projected (step S1210: No), the computer 50 returns to step S1207. In a case where all second images are projected (step S1210: Yes), the computer 50 performs the control of adjusting the projection of the projection apparatus 10 based on the captured images of the plurality of second images received in step S1209 (step S1211) and finishes the series of processing.

Another Example of First Image 71 Projected by Projection Apparatus 10

Figure 13:
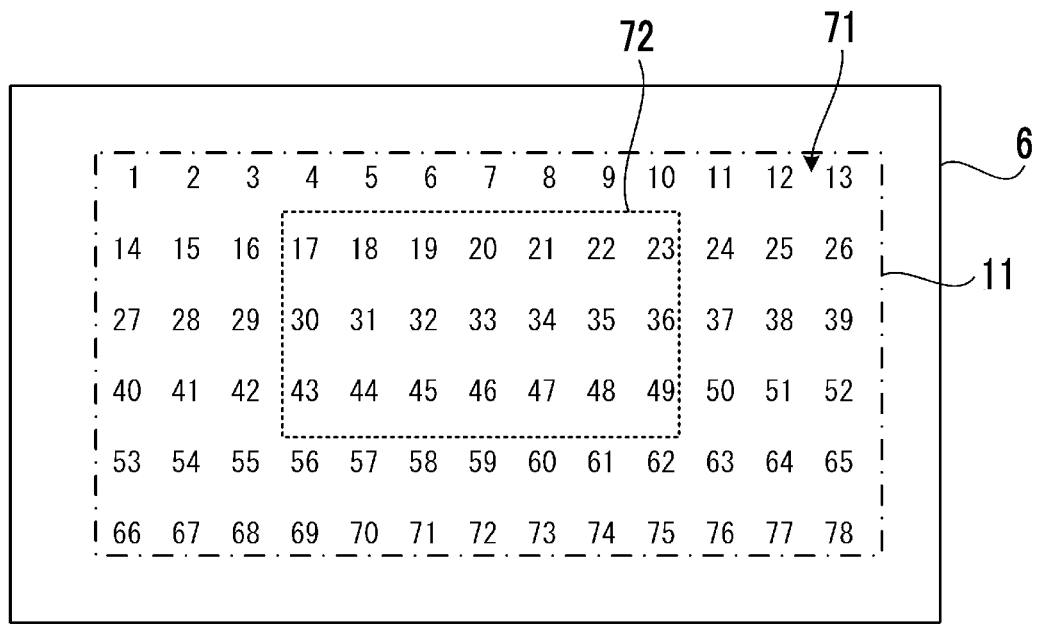
FIG. 13 is a diagram illustrating another example of a first image 71 projected by the projection apparatus 10.
Figure 13:
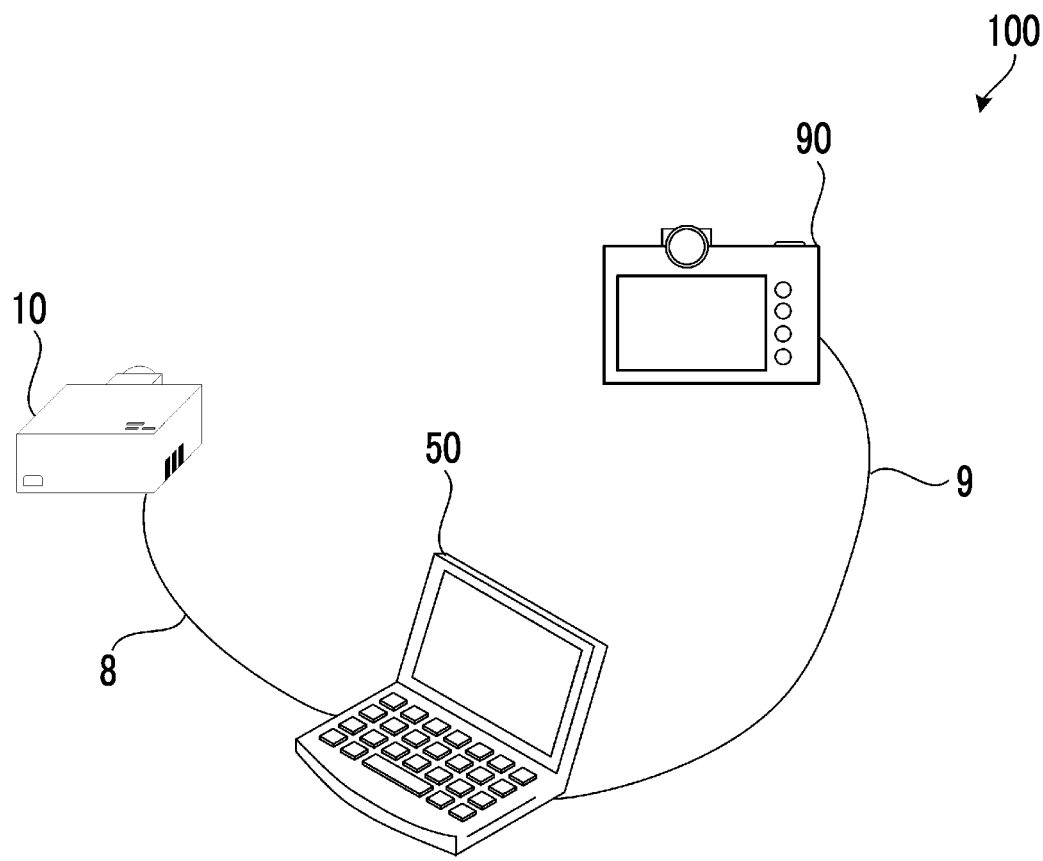

FIG. 13 is a diagram illustrating another example of the first image 71 projected by the projection apparatus 10. As illustrated in FIG. 13, the first image 71 may be an image in which different numbers or the like for each position are arranged as the marker images.

In addition, the computer 50 stores a correspondence table in which each number included in the first image 71 as the marker image is associated with a position at which the number is arranged in the projection range 11. That is, the marker images of the first image 71 illustrated in FIG. 13 are associated with positions of the marker images within the projection range 11.

Accordingly, even in a case where only a part of the marker images of the first image 71 is included in the captured image received from the imaging apparatus 90, the computer 50 can determine at which position the marker images of the part are present within the projection range 11.

For example, in a case where marker images of a predetermined ratio or more of the marker images of the first image 71 are included in the captured image of the first image 71 received from the imaging apparatus 90, the computer 50 determines the position of each marker image included in the captured image of the first image 71 within the projection range 11 based on the correspondence table, detects the distortion of the projection image within the entire projection range 11 based on a determination result, and performs the distortion correction of the projection image based on the detection result. In this case, the computer 50 may not perform the control of projecting the second image (for example, the second images 81 to 84) from the projection apparatus 10.

Another Example of Second Image 81 Projected by Projection Apparatus 10

Figure 14:
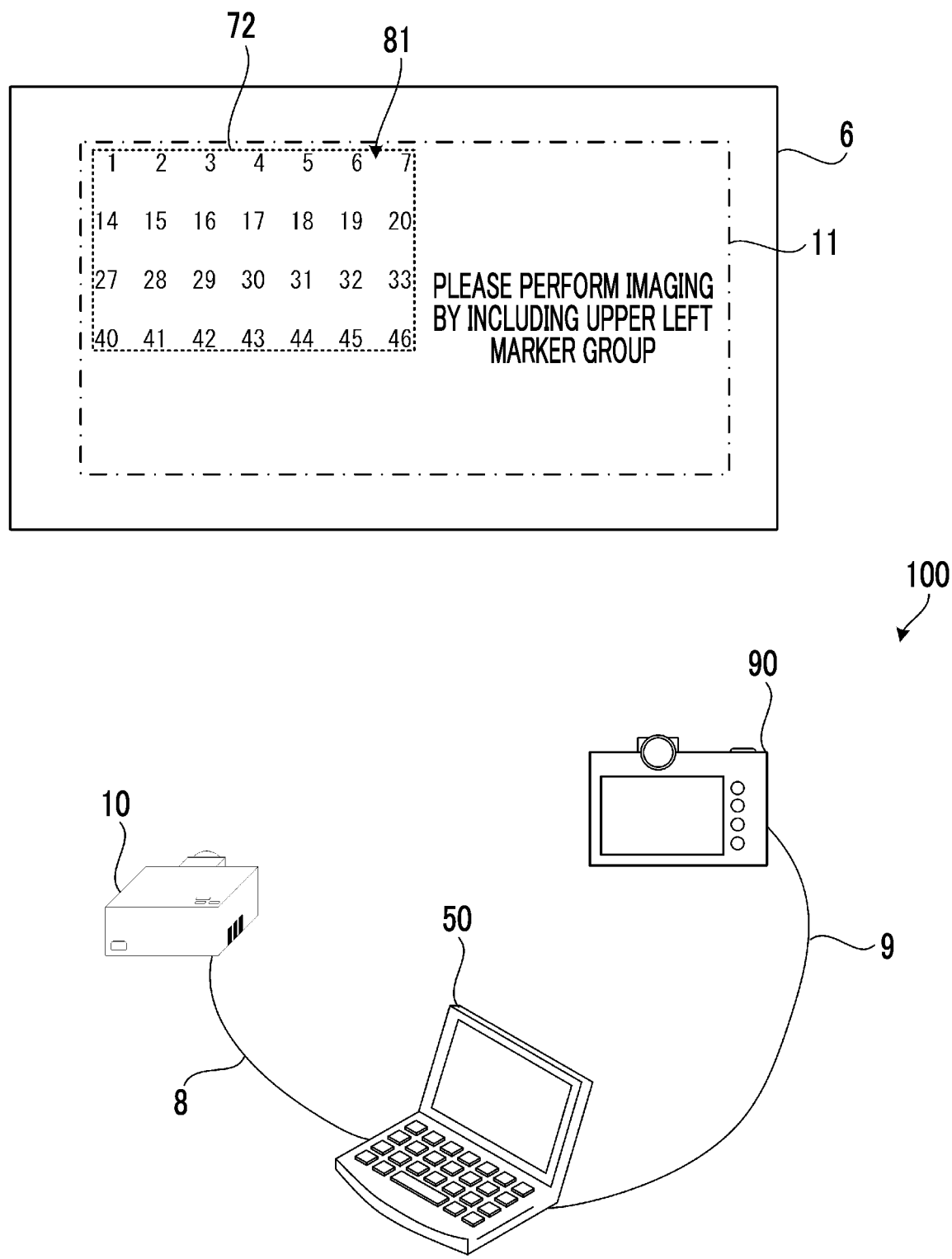
FIG. 14 is a diagram illustrating another example of a second image 81 projected by the projection apparatus 10.

FIG. 14 is a diagram illustrating another example of the second image 81 projected by the projection apparatus 10. As illustrated in FIG. 14, the second image 81 may be an image in which different numbers or the like for each position are arranged as the marker images. In the example in FIG. 14, the second image 81 is obtained by extracting an upper left part of 4×7=28 marker images from the first image 71 illustrated in FIG. 13.

In addition, the computer 50 stores a correspondence table in which each number included in the second image 81 as the marker image is associated with a position at which the number is arranged in the projection range 11. This correspondence table may be the same as the correspondence table described using FIG. 13. That is, the marker images of the second image 81 illustrated in FIG. 14 are associated with positions of the marker images within the projection range 11.

Accordingly, even in a case where only a part of the second image 81 is included in the captured image received from the imaging apparatus 90, the computer 50 can determine at which position the marker images of the part are present within the projection range 11.

While the second image 81 is described, the second images 82 to 84 may also be images in which different numbers or the like for each position are arranged as the marker images.

For example, in a case where only a part of the marker images of the second image 81 is included in the captured image of the second image 81 received from the imaging apparatus 90, the computer 50 determines the position of each marker image included in the captured image of the second image 81 within the projection range 11 based on the correspondence table and combines the captured image of the second image 81 with the captured images of the second images 82 to 84 based on the determination result. Accordingly, while a part of a region of the second image 81 is missing, an image equivalent to the captured image of the entire first image 71 can be generated. The computer 50 detects the distortion of the projection image within the projection range 11 based on the distortion in shape or arrangement of the marker images included in the generated image and performs the distortion correction of the projection image based on the detection result.

In the examples in FIG. 13 and FIG. 14, while different numbers for each position are illustratively described as the marker images associated with the positions within the projection range 11, the marker images associated with the positions within the projection range 11 are not limited thereto and may be, for example, images of different alphabets or symbols for each position. The marker images associated with the positions within the projection range 11 may be images of different colors or the like for each position. In addition, while an example in which all marker images within the image are different is described, only a part of the marker images in the image may be different.

In addition, the marker images associated with the positions within the projection range 11 may be different Quick Response (QR) codes (registered trademark), ArUco markers, or the like for each position. In this case, information indicating the positions of the marker images within the projection range 11 can be included in the marker images. Accordingly, even in a case where the correspondence table is not stored, the computer 50 can determine the positions of the marker images within the projection range 11 by reading the information of the QR codes or ArUco markers included in the captured image as the marker images.

Figure 15:
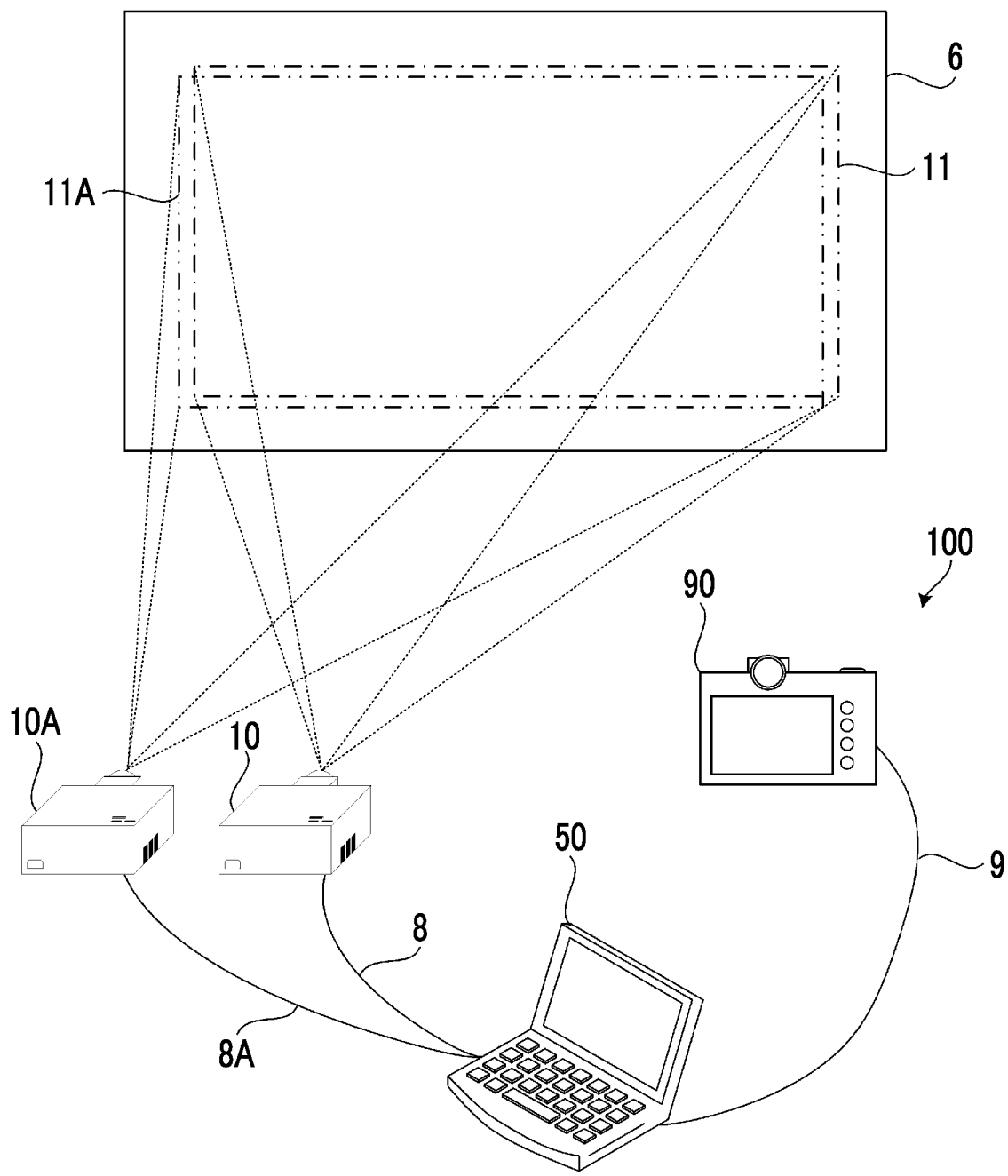
FIG. 15 is a diagram illustrating an example of a state before adjustment of stack projection by a plurality of projection apparatuses.

Example of State Before Adjustment of Stack Projection by Plurality of Projection Apparatuses FIG. 15 is a diagram illustrating an example of a state before adjustment of stack projection by a plurality of projection apparatuses. In FIG. 15, the same parts as the parts illustrated in FIG. 1 will be designated by the same reference numerals and will not be described. As illustrated in FIG. 15, the projection system 100 may further include a projection apparatus 10A.

The projection apparatus 10A has the same configuration as the projection apparatus 10 and performs projection to the projection target object 6 together with the projection apparatus 10. The computer 50 can communicate with the projection apparatus 10A. In the example illustrated in FIG. 15, the computer 50 is connected to the projection apparatus 10A through a communication cable 8A and can communicate with the projection apparatus 10A.

A projection range 11A illustrated by a double dot dashed line is a region that is irradiated with projection light by the projection apparatus 10A in the projection target object 6. In the example illustrated in FIG. 15, the projection range 11A is rectangular. The projection range 11A is a part or the entirety of a projectable range within which the projection can be performed by the projection apparatus 10A.

In this example, a case of performing the stack projection for improving a dynamic range or gradation representation by making the entire projection range 11 of the projection apparatus 10 overlap with the entire projection range 11A of the projection apparatus 10A and projecting the same image from the projection apparatuses 10 and 10A will be described.

Processing Based on Imaging Condition by Computer 50

Figure 16:
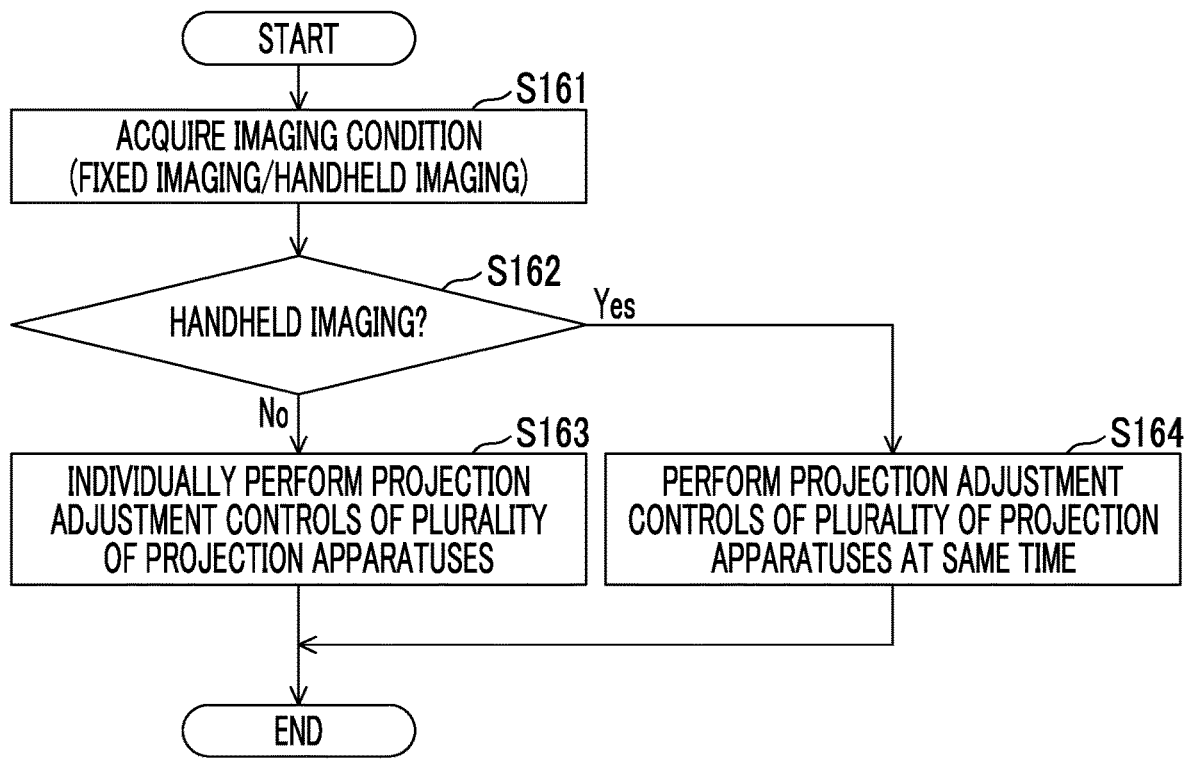
FIG. 16 is a flowchart illustrating an example of processing by the computer 50 based on an imaging condition.

FIG. 16 is a flowchart illustrating an example of processing by the computer 50 based on an imaging condition. In the example illustrated in FIG. 15, for example, the computer 50 may execute the processing illustrated in FIG. 16.

First, the computer 50 acquires an imaging condition of the imaging apparatus 90 (step S161). This imaging condition of the imaging apparatus 90 includes whether the imaging by the imaging apparatus 90 is fixed imaging or handheld imaging. The fixed imaging is imaging in a state where the imaging apparatus 90 is fixed to an object such as a tripod or a seat that does not shake. The handheld imaging is imaging in a state where the imaging apparatus 90 is held in hands by the user, and a shake occurs.

For example, the computer 50 acquires the imaging condition of whether the imaging is the fixed imaging or the handheld imaging by receiving a user operation with respect to the computer 50. Alternatively, the computer 50 may acquire the imaging condition of whether the imaging is the fixed imaging or the handheld imaging based on a state of the shake of the imaging apparatus 90 depending on a gyro sensor or the like in the imaging apparatus 90, by communicating with the imaging apparatus 90. For example, in a case where the shake of the imaging apparatus 90 detected by the gyro sensor or the like is less than a threshold value, the computer 50 determines that the imaging is the fixed imaging. In a case where the shake of the imaging apparatus 90 detected by the gyro sensor or the like is greater than or equal to the threshold value, the computer 50 determines that the imaging is the handheld imaging.

Alternatively, the computer 50 may acquire the imaging condition of whether the imaging is the fixed imaging or the handheld imaging based on an ON/OFF state of a camera shake correction function in the imaging apparatus 90, by communicating with the imaging apparatus 90. For example, in a case where the camera shake correction function in the imaging apparatus 90 is in the OFF state, the computer 50 determines that the imaging is the fixed imaging. In a case where the camera shake correction function in the imaging apparatus 90 is in the ON state, the computer 50 determines that the imaging is the handheld imaging.

Next, the computer 50 determines whether or not the imaging of the imaging apparatus 90 is the handheld imaging based on the imaging condition acquired in step S161 (step S162). In a case where the imaging is not the handheld imaging (step S162: No), the computer 50 individually performs projection adjustment controls of the projection apparatuses 10 and 10A (step S163) and finishes the series of processing. The individual projection adjustment controls in step S163 will be described using FIG. 17 and FIG. 18.

In step S162, in a case where the imaging is the handheld imaging (step S162: Yes), the computer 50 performs the projection adjustment controls of the projection apparatuses 10 and 10A at the same time (step S164) and finishes the series of processing. The projection adjustment controls in step S164 will be described using FIG. 19.

Individual Projection of Projection Apparatuses 10 and 10A

Figure 17:
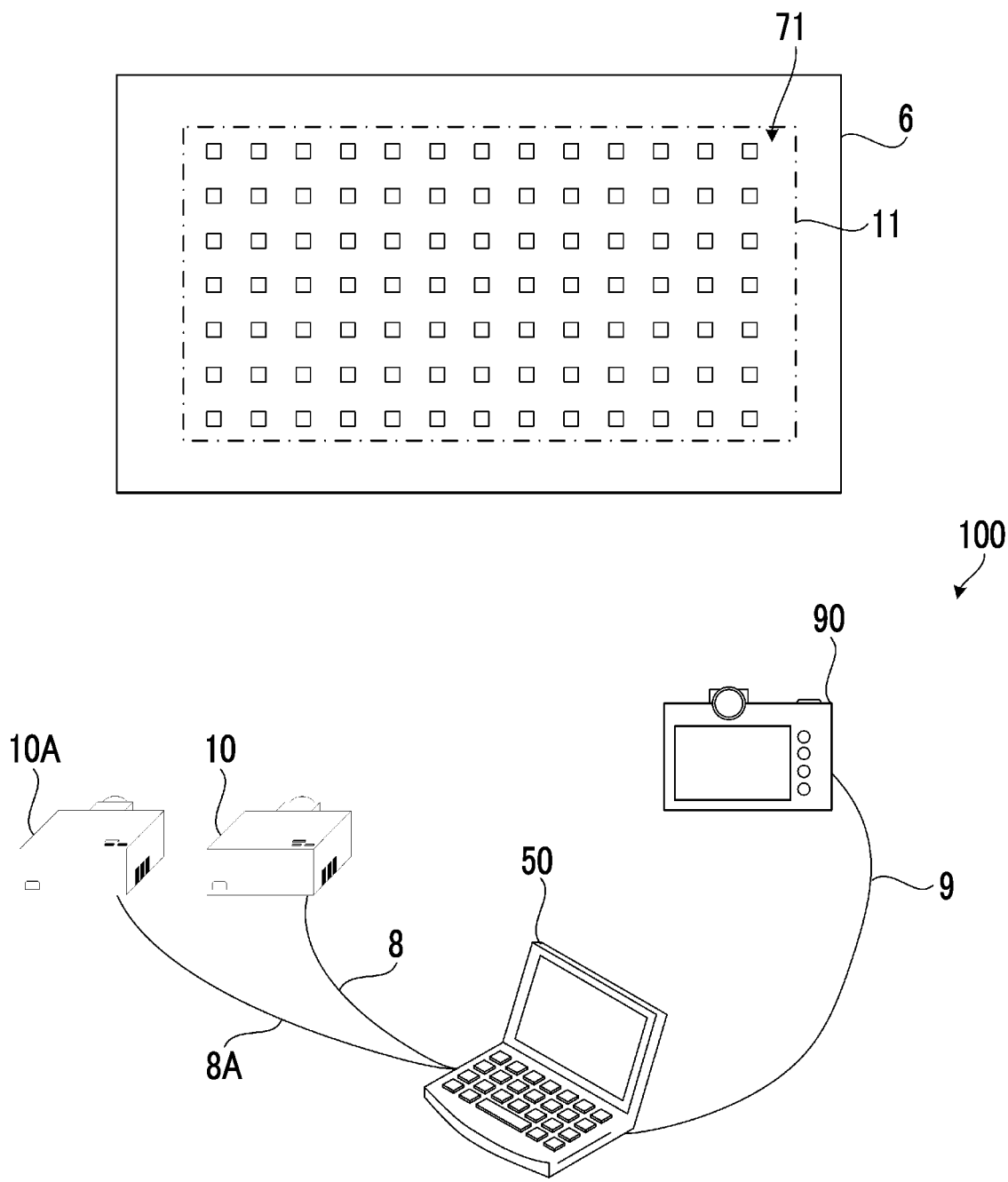
FIG. 17 is a diagram (Part 1) illustrating an example of individual projection of projection apparatuses 10 and 10A.
Figure 18:
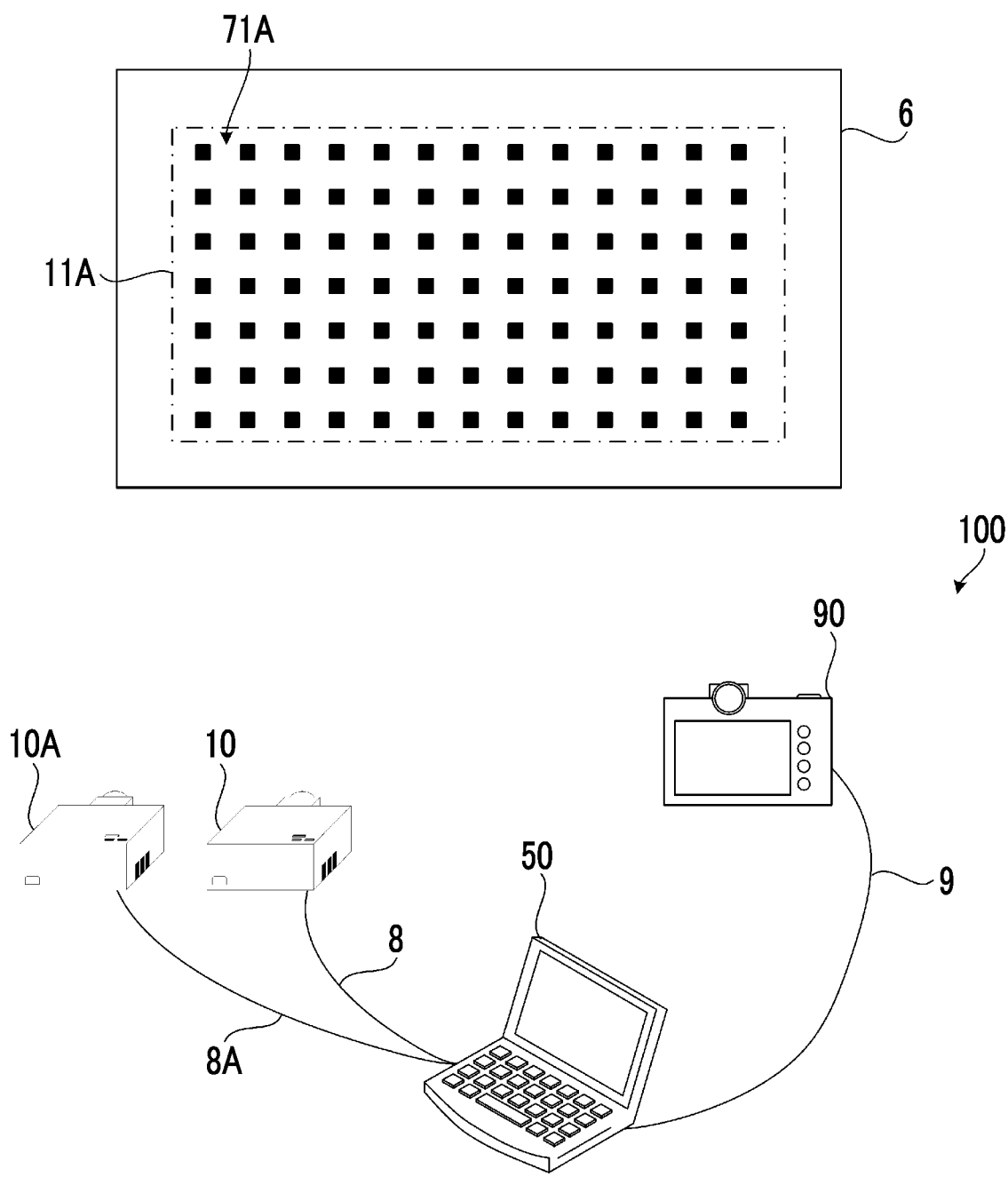
FIG. 18 is a diagram (Part 2) illustrating the example of the individual projection of the projection apparatuses 10 and 10A.

FIG. 17 and FIG. 18 are diagrams illustrating an example of individual projection of the projection apparatuses 10 and 10A. In a case where the imaging of the imaging apparatus 90 is the fixed imaging, for example, the computer 50 first adjusts the projection of the projection apparatus 10 by executing the processing illustrated in FIG. 12 on the projection apparatus 10 in step S163 in FIG. 16. Next, the computer 50 adjusts the projection of the projection apparatus 10A by executing the processing illustrated in FIG. 12 on the projection apparatus 10A.

FIG. 17 illustrates a state where the first image 71 is projected by the projection apparatus 10 in step S1201 of the processing in FIG. 12 executed on the projection apparatus 10. While illustration is not provided, in a case where step S1207 is executed in the processing in FIG. 12 executed on the projection apparatus 10, the second images 81 to 84 are projected from the projection apparatus 10 as in FIG. 8 to FIG. 11.

FIG. 18 illustrates a state where a first image 71A is projected by the projection apparatus 10A in step S1201 of the processing in FIG. 12 executed on the projection apparatus 10A. The first image 71A illustrated in FIG. 18 is the same image as the first image 71 illustrated in FIG. 17. However, marker images included in the first image 71A are marker images that can be distinguished from the marker images included in the first image 71 by the image recognition. For example, the marker images that can be distinguished by the image recognition are marker images having different shapes, different colors, different line types (a solid line, a dotted line, and the like), or different spatial frequencies (arrangement intervals).

In the examples in FIG. 17 and FIG. 18, while the marker images included in the first image 71 are rectangular white outlined images, the marker images included in the first image 71A are rectangular black solid images. While illustration is not provided, in a case where step S1207 is executed in the processing in FIG. 12 executed on the projection apparatus 10A, the second images are projected from the projection apparatus 10A as in FIG. 8 to FIG. 11. While these second images are the same as the second images 81 to 84, the rectangular black solid marker images are included instead of the rectangular white outlined marker images.

As illustrated in FIG. 17 and FIG. 18, in a case where the imaging of the imaging apparatus 90 is the fixed imaging, the computer 50 individually performs the projection adjustment controls of the projection apparatuses 10 and 10A. In this case, the computer 50 projects the first images 71 and 71A from the projection apparatuses 10 and 10A at different timings. However, since the imaging of the imaging apparatus 90 is the fixed imaging, a position and a direction of the imaging apparatus 90 are fixed even in a case where the first images 71 and 71A are projected and captured at different timings. Thus, the computer 50 can determine a relative positional relationship between the projection range 11 and the projection range 11A based on captured images of the first images 71 and 71A.

In addition, since the first images 71 and 71A are projected and captured at different timings, the computer 50 can receive each of the captured image of the first image 71 and the captured image of the first image 71A from the imaging apparatus 90. Thus, since the computer 50 may not perform processing of separately extracting each of the first images 71 and 71A from one captured image, the relative positional relationship between the projection ranges 11 and 11A can be securely determined by simple processing.

Projection of Projection Apparatuses 10 and 10A at Same Time

Figure 19:
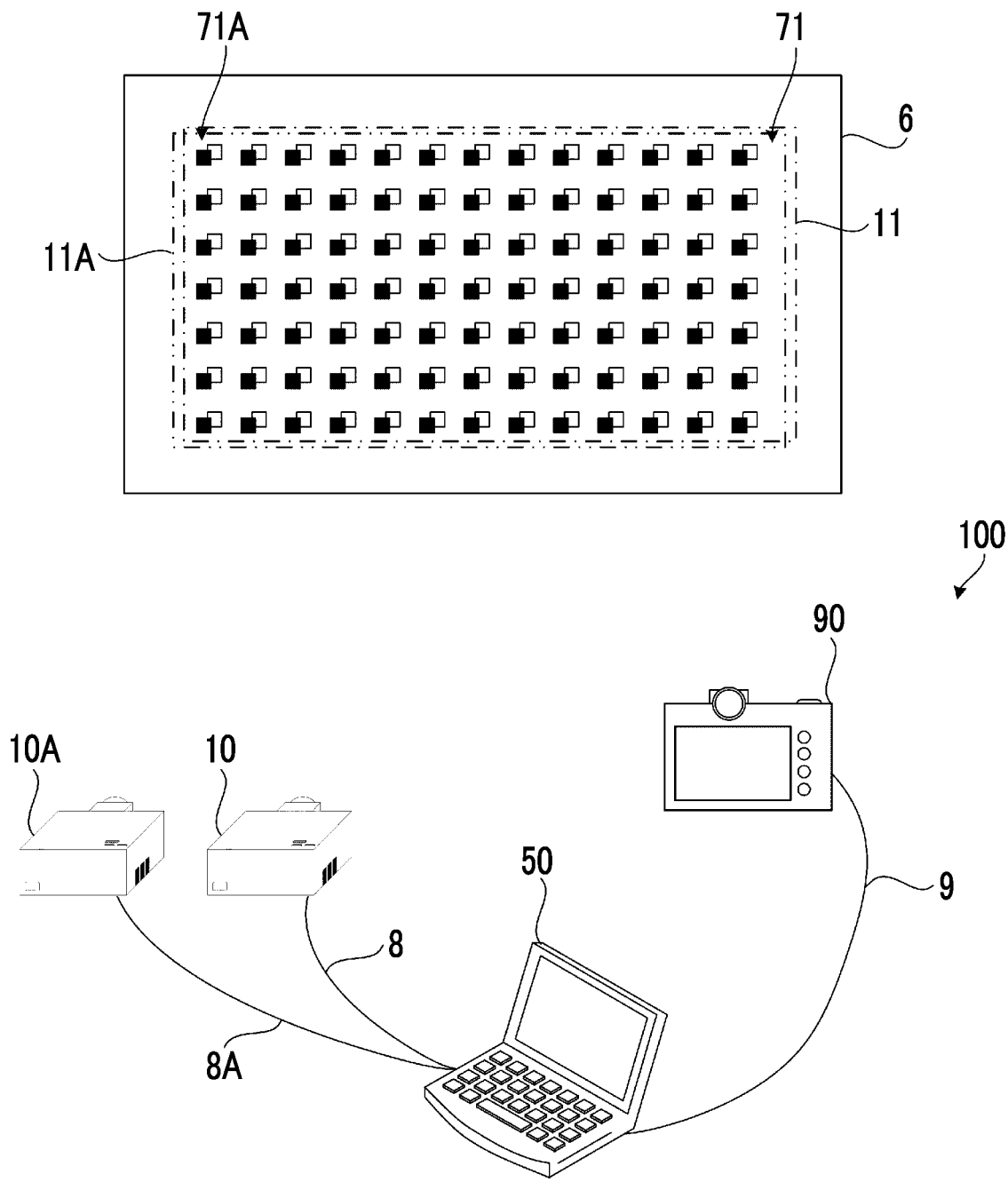
FIG. 19 is a diagram illustrating an example of projection of the projection apparatuses 10 and 10A at the same time.

FIG. 19 is a diagram illustrating an example of projection of the projection apparatuses 10 and 10A at the same time. In a case where the imaging of the imaging apparatus 90 is the handheld imaging, for example, the computer 50 adjusts the projection of the projection apparatuses 10 and 10A at the same time by collectively executing the processing illustrated in FIG. 12 on the projection apparatuses 10 and 10A in step S164 in FIG. 16.

FIG. 19 illustrates a state where the first images 71 and 71A are projected at the same time by the projection apparatuses 10 and 10A in step S1201 of the processing in FIG. 12 executed on the projection apparatuses 10 and 10A. In a case where step S1205 is executed in the processing in FIG. 12 executed on the projection apparatuses 10 and 10A, the computer 50 determines the relative positional relationship between the projection range 11 and the projection range 11A by separately extracting each of the first image 71 from the projection apparatus 10 and the first image 71A from the projection apparatus 10A from the captured image obtained in step S1203.

While illustration is not provided, in a case where step S1207 is executed in the processing in FIG. 12 executed on the projection apparatuses 10 and 10A, first, the second image 81 from the projection apparatus 10 illustrated in FIG. 8 and a second image (for example, obtained by extracting an upper left part of 4×7=28 marker images from the first image 71A) from the projection apparatus 10A are projected at the same time.

Next, the second image 82 from the projection apparatus 10 illustrated in FIG. 9 and a second image (for example, obtained by extracting an upper right part of 4×7=28 marker images from the first image 71A) from the projection apparatus 10A are projected at the same time. Next, the second image 83 from the projection apparatus 10 illustrated in FIG. 10 and a second image (for example, obtained by extracting a lower left part of 4×7=28 marker images from the first image 71A) from the projection apparatus 10A are projected at the same time. Next, the second image 84 from the projection apparatus 10 illustrated in FIG. 11 and a second image (for example, obtained by extracting a lower right part of 4×7=28 marker images from the first image 71A) from the projection apparatus 10A are projected at the same time.

In step S1211 of the processing in FIG. 12 executed on the projection apparatuses 10 and 10A, the computer 50 determines the relative positional relationship between the projection range 11 and the projection range 11A by separately extracting each of the second image from the projection apparatus 10 and the second image from the projection apparatus 10A from each captured image obtained in step S1209.

As illustrated in FIG. 19, in a case where the imaging of the imaging apparatus 90 is the handheld imaging, the computer 50 performs the projection of the projection apparatuses 10 and 10A at the same time. Accordingly, even in a case where the position and the direction of the imaging apparatus 90 are changed by the handheld imaging, the relative positional relationship between the projection range 11 and the projection range 11A can be determined by separately extracting each of the image of the projection apparatus 10 and the image of the projection apparatus 10A from the captured image including the image of the projection apparatus 10 and the image of the projection apparatus 10A. In addition, since the first images 71 and 71A are projected and captured at the same time, the number of times the user of the imaging apparatus 90 performs the imaging can be reduced.

Stack Projection by Making Projection Ranges 11 and 11A Overlap

Figure 20:
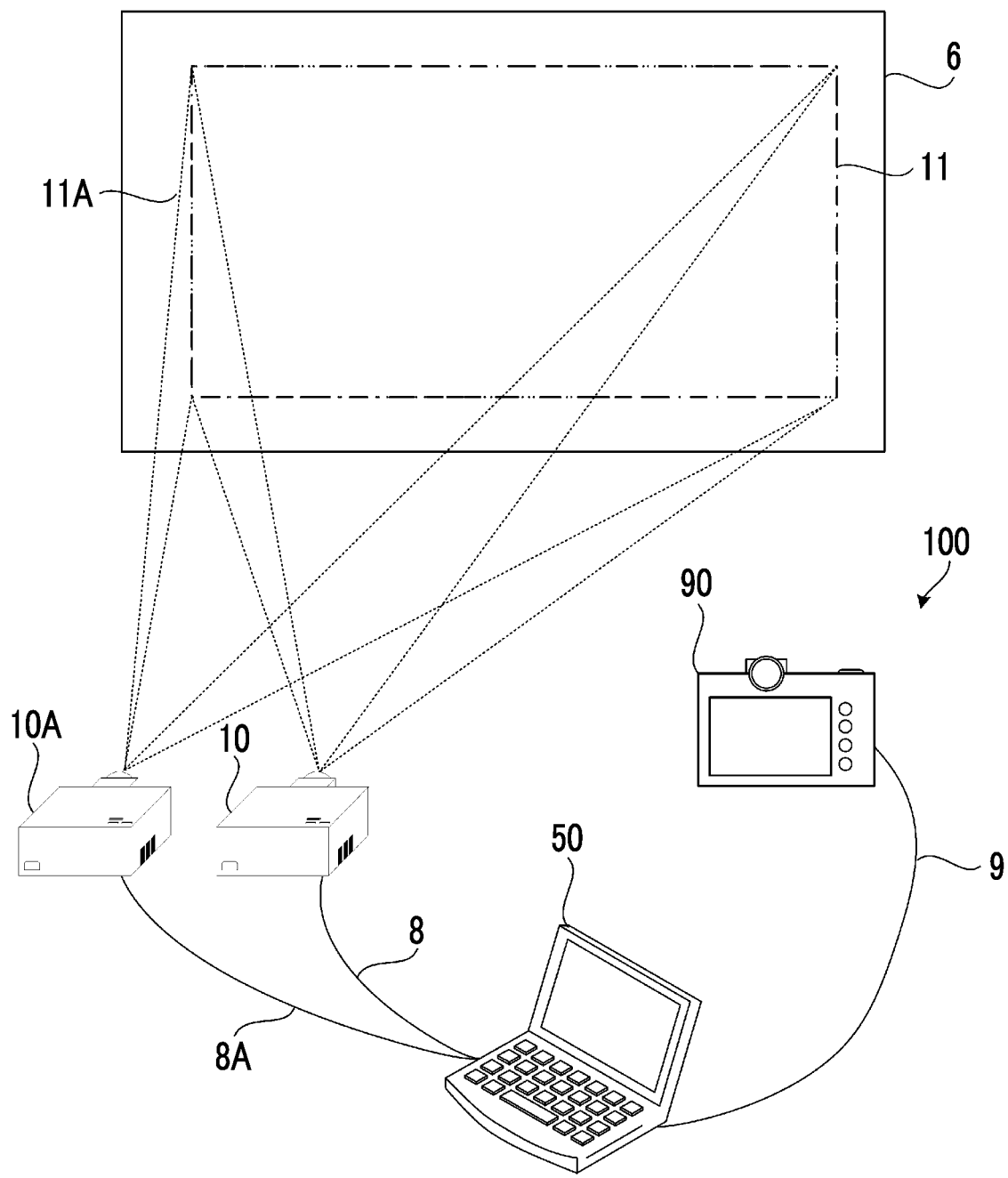
FIG. 20 is a diagram illustrating an example of the stack projection by making projection ranges 11 and 11A overlap.

FIG. 20 is a diagram illustrating an example of the stack projection by making the projection ranges 11 and 11A overlap. As described using FIG. 17, FIG. 18, or FIG. 19, the computer 50 determines the relative positional relationship between the projection ranges 11 and 11A.

The computer 50 adjusts relative projection positions between the projection apparatus 10 and the projection apparatus 10A based on a result of the determination such that the entire projection range 11 overlaps with the entire projection range 11A as illustrated in FIG. 20. For example, this adjustment can be performed by controlling a shift mechanism (the optical system shift mechanism or the electronic shift mechanism) of at least any of the projection apparatus 10 or 10A.

For example, by controlling the shift mechanism of the projection apparatus 10A to adjust the projection range 11A based on the projection range 11 of the projection apparatus 10, the computer 50 enables the stack projection by making the entire projection range 11 overlap with the entire projection range 11A.

For example, in a case of using the electronic shift mechanism, the computer 50 calculates a conversion parameter for correcting the projection range 11A such that the projection range 11A matches the projection range 11. For example, the conversion parameter includes a projective transformation (homography) matrix. The computer 50 can match the projection range 11A to the projection range 11 by correcting an input image of the projection apparatus 10A using the calculated conversion parameter and performing the projection from the projection apparatus 10A.

In a case of performing the stack projection by making the projection ranges of the projection apparatuses 10 and 10A (the plurality of projection apparatuses) overlap, the computer 50 adjusts the overlapping between the projection range 11 and the projection range 11A by adjusting the projection range 11A of the projection apparatus 10A based on the projection range 11 of the projection apparatus 10.

While a case of performing the projection adjustment controls for the projection of the projection apparatuses 10 and 10A in the stack projection of projecting the same image from the projection apparatuses 10 and 10A by making the entire projection range 11 of the projection apparatus 10 overlap with the entire projection range 11A of the projection apparatus 10A is described, a form of performing the projection adjustment controls for the projection of the projection apparatuses 10 and 10A is not limited thereto.

For example, blending projection for obtaining a large screen of projection may be performed by making an end part of the projection range 11 of the projection apparatus 10 overlap with an end part of the projection range 11A of the projection apparatus 10A and projecting each of divided images obtained by dividing a large image from the projection apparatuses 10 and 10A.

Figure 21:
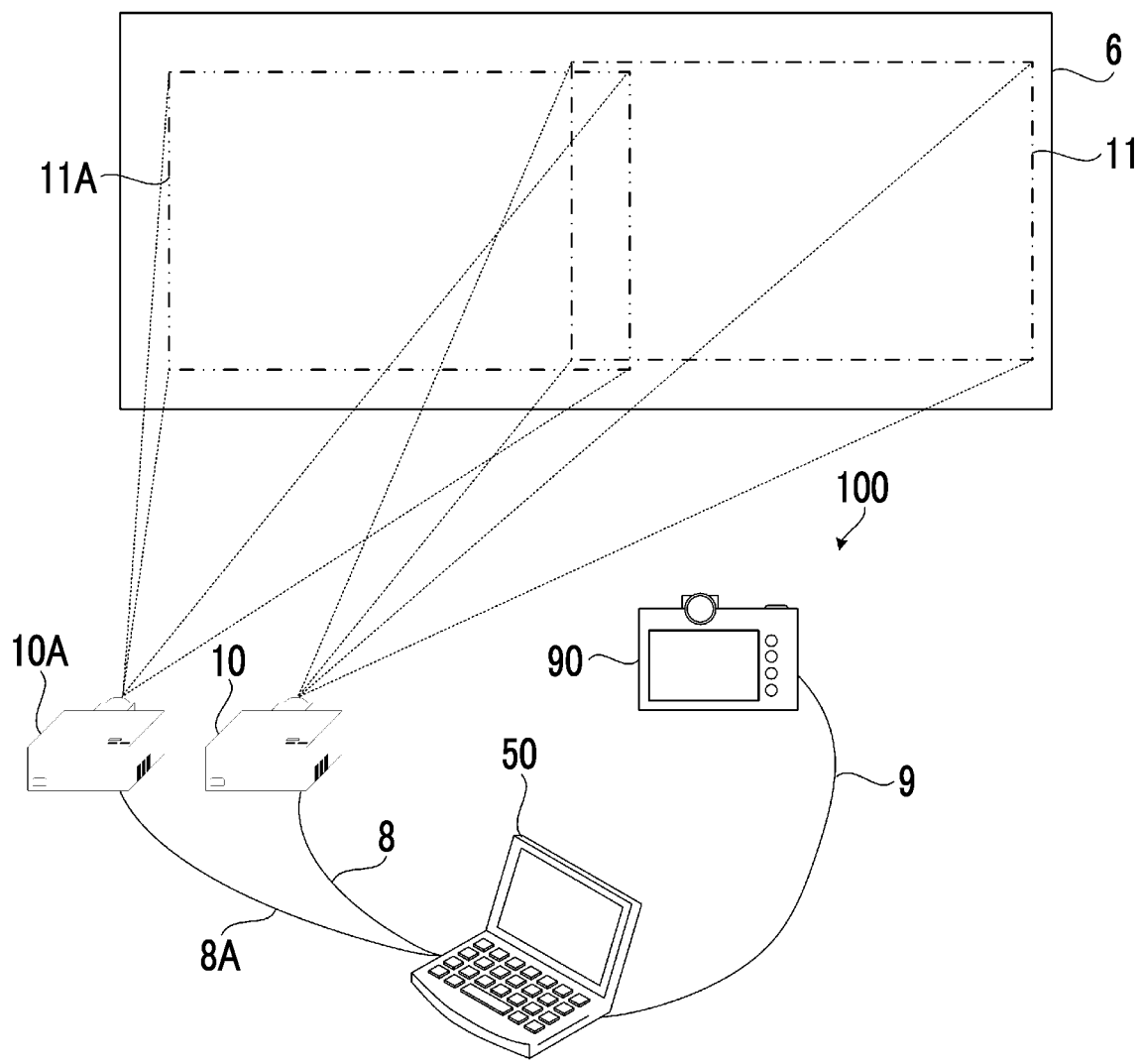
FIG. 21 is a diagram illustrating an example of a state before adjustment of blending projection by the plurality of projection apparatuses.

State Before Adjustment of Blending Projection by Plurality of Projection Apparatuses FIG. 21 is a diagram illustrating an example of a state before adjustment of the blending projection by the plurality of projection apparatuses. In FIG. 21, the same parts as the parts illustrated in FIG. 15 will be designated by the same reference numerals and will not be described. In the example in FIG. 21, in order to perform the blending projection, positions and directions of the projection apparatuses 10 and 10A are adjusted such that only the end part of the projection range 11 overlaps with the end part of the projection range 11A.

Even in this case, as in the case of the stack projection, the computer 50 can perform the projection adjustment controls in performing registration or the distortion correction of the projection ranges 11 and 11A. For example, in the state illustrated in FIG. 21, the computer 50 executes the processing illustrated in FIG. 16. In this case, the first images and the second images projected from the projection apparatuses 10 and 10A are the same as in the case of the stack projection.

However, in this case, in adjusting the projection ranges 11 and 11A, the computer 50 adjusts a relative position between the projection ranges 11 and 11A such that a specific region (for example, a right end region having a constant width) of the projection range 11 overlaps with a specific region (for example, a left end region having a constant width) of the projection range 11A. The specific region of the projection range 11 and the specific region of the projection range 11A have the same size.

Furthermore, the computer 50 performs blending processing such as dividing brightness of each of the projection images from the projection apparatuses 10 and 10A in half for an overlapping portion between the projection ranges 11 and 11A. Accordingly, incongruity such as bright display of only the overlapping portion between the projection ranges 11 and 11A can be reduced.

Blending Projection by Making Projection Ranges 11 and 11A Overlap

Figure 22:
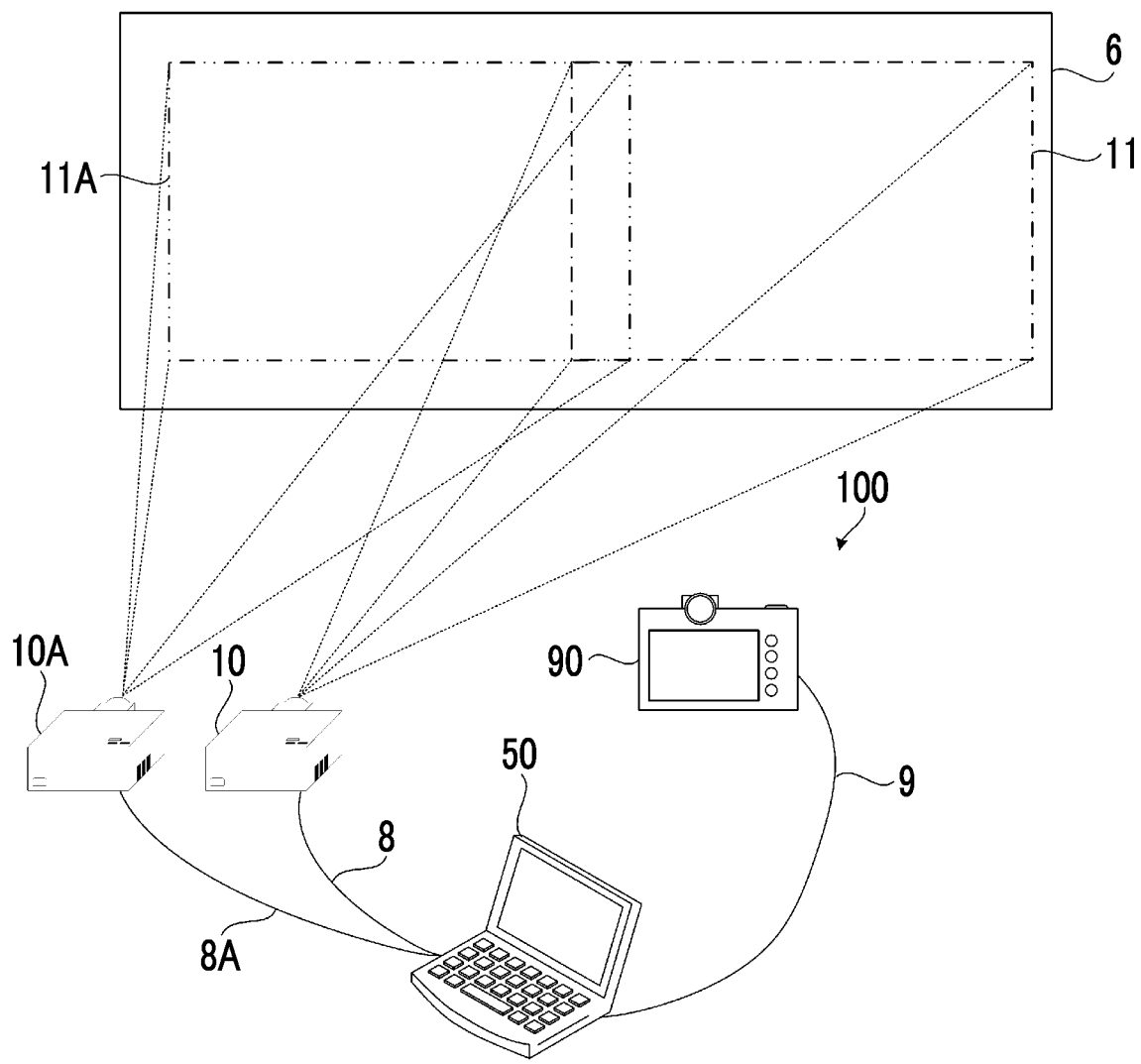
FIG. 22 is a diagram illustrating an example of the blending projection by making the projection ranges 11 and 11A overlap.

FIG. 22 is a diagram illustrating an example of the blending projection by making the projection ranges 11 and 11A overlap. In the processing illustrated in FIG. 16, the computer 50 determines the relative positional relationship between the projection ranges 11 and 11A based on captured data from the imaging apparatus 90.

The computer 50 adjusts the relative projection positions between the projection apparatus 10 and the projection apparatus 10A based on a result of the determination such that the specific region of the projection range 11 overlaps with the specific region of the projection range 11A as illustrated in FIG. 22. For example, this adjustment can be performed by controlling the shift mechanism (the optical system shift mechanism or the electronic shift mechanism) of at least any of the projection apparatus 10 or 10A.

For example, by controlling the shift mechanisms of the projection apparatuses 10 and 10A to adjust the projection ranges 11 and 11A, the computer 50 enables the blending projection by making the specific region of the projection range 11 overlap with the specific region of the projection range 11A.

For example, in a case of using the electronic shift mechanisms, the computer 50 calculates a conversion parameter for correcting the projection ranges 11 and 11A such that the specific region of the projection range 11 matches the specific region of the projection range 11A. For example, the conversion parameter includes a projective transformation (homography) matrix. The computer 50 can match the specific region of the projection range 11 to the specific region of the projection range 11A by correcting input images of the projection apparatuses 10 and 10A using the calculated conversion parameter and performing the projection from the projection apparatuses 10 and 10A.

In a case of performing the blending projection by making a part of the projection ranges of the projection apparatuses 10 and 10A (the plurality of projection apparatuses) overlap, the computer 50 adjusts the overlapping between the specific region of the projection range 11 and the specific region of the projection range 11A by adjusting each of the projection ranges 11 and 11A. Accordingly, by performing the blending processing such as adjusting brightness of the specific regions, the blending processing is applied to only the overlapping portion between the projection range 11 and the projection range 11A, and incongruity of appearance can be reduced.

Another Example of Processing Based on Imaging Condition by Computer 50

Figure 23:
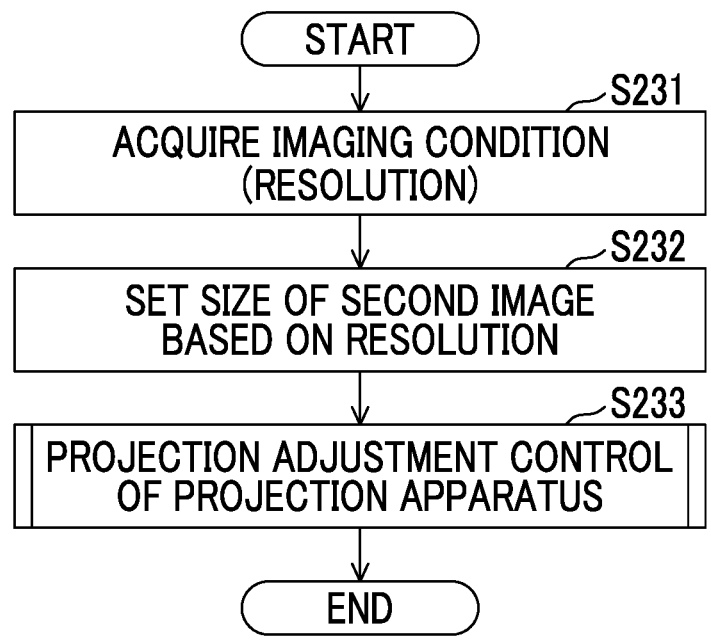
FIG. 23 is a flowchart illustrating another example of the processing by the computer 50 based on the imaging condition.

FIG. 23 is a flowchart illustrating another example of the processing by the computer 50 based on the imaging condition. The computer 50 may execute the processing illustrated in FIG. 23. In this example, for example, the projection apparatus 10 is the only projection apparatus that performs the projection.

First, the computer 50 acquires the imaging condition of the imaging apparatus 90 (step S231). This imaging condition of the imaging apparatus 90 includes the resolution of the imaging of the imaging apparatus 90. The resolution is definition of the imaging and is decided by the number of pixels of an imaging sensor of the imaging apparatus 90, the angle of view of the imaging of the imaging apparatus 90, and the like.

For example, the computer 50 acquires the resolution of the imaging by receiving the resolution by the user operation with respect to the computer 50. Alternatively, the computer 50 may acquire the resolution of the imaging by communicating with the imaging apparatus 90 to receive information such as the number of pixels and the angle of view from the imaging apparatus 90.

Next, the computer 50 sets a size of the second image based on the resolution of the imaging included in the imaging condition acquired in step S231 (step S232). For example, in a case where the resolution of the imaging is greater than or equal to a threshold value, the computer 50 sets the size of the second image to "normal". In a case where the resolution of the imaging is less than the threshold value, the computer 50 sets the size of the second image to "small".

Next, the computer 50 performs the projection adjustment control of the projection apparatus 10 (step S233) and finishes the series of processing. In step S233, for example, the computer 50 adjusts the projection of the projection apparatus 10 by executing the processing illustrated in FIG. 12 on the projection apparatus 10. In a case of executing step S1206 in the processing illustrated in FIG. 12, the computer 50 generates the second images based on the size of the second image set in step S232.

For example, in a case where the size of the second image is set to "normal" in step S232, the computer 50 generates the second images 81 to 84 illustrated in FIG. 8 to FIG. 11 in step S1206. Meanwhile, in a case where the size of the second image is set to "small" in step S232, the computer 50 generates second images smaller than the second images 81 to 84 illustrated in FIG. 8 to FIG. 11 in step S1206. Since these second images are smaller than the second images 81 to 84 illustrated in FIG. 8 to FIG. 11, the computer 50 generates more second images than the second images 81 to 84 illustrated in FIG. 8 to FIG. 11 to cover the projection range 11.

Figure 24:
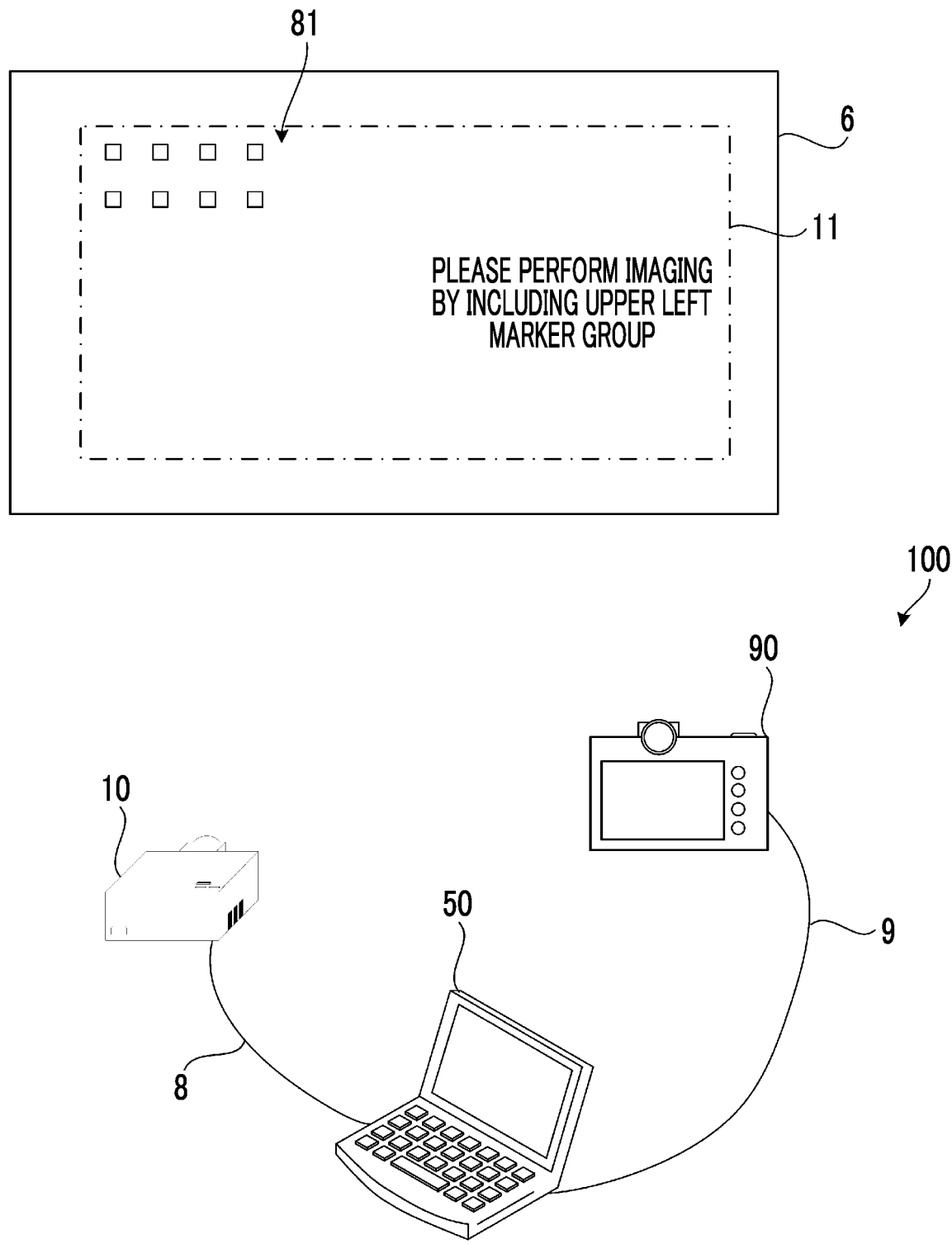
FIG. 24 is a diagram illustrating an example of the second image in a case where a resolution of imaging of the imaging apparatus 90 is low.

Second Image in Case where Resolution of Imaging of Imaging Apparatus 90 is Low FIG. 24 is a diagram illustrating an example of the second image in a case where the resolution of the imaging of the imaging apparatus 90 is low. In a case where the size of the second image is set to "small" in step S232 in FIG. 23, for example, the computer 50 projects the second image 81 illustrated in FIG. 24 from the projection apparatus 10 in step S1206 of the first execution of the processing in FIG. 12.

The second image 81 illustrated in FIG. 24 is a small image having a small number of included marker images, compared to the second image 81 illustrated in FIG. 8. Accordingly, the user of the imaging apparatus 90 can capture the second image 81 by approaching closer to the projection target object 6. Thus, even in a case where the resolution of the imaging of the imaging apparatus 90 is low, a captured image from which the marker images included in the second image 81 can be extracted with high accuracy can be obtained.

While the second image 81 projected in step S1206 of the first execution of the processing in FIG. 12 is described in FIG. 24, the computer 50 performs a control of projecting the same second image as the second image 81 illustrated in FIG. 24 from the projection apparatus 10 while changing the projection position in step S1206 of the second and later execution of the processing in FIG. 12.

As illustrated in FIG. 23 and FIG. 24, the computer 50 may perform a control of projecting the second image having the size corresponding to the resolution of the imaging of the imaging apparatus 90 from the projection apparatus 10. Accordingly, even in a case where the resolution of the imaging of the imaging apparatus 90 is low, a captured image from which the marker images included in the second image can be extracted with high accuracy is obtained, and the projection of the projection apparatus 10 can be accurately adjusted.

While the control of projecting the second image having the size corresponding to the resolution of the imaging from the projection apparatus 10 in a case of performing the projection of only the projection apparatus 10 is described, a control of projecting the second image having the size corresponding to the resolution of the imaging from the projection apparatuses 10 and 10A may also be performed in a case of performing the projection of the projection apparatuses 10 and 10A.

Still Another Example of Processing Based on Imaging Condition by Computer 50

Figure 25:
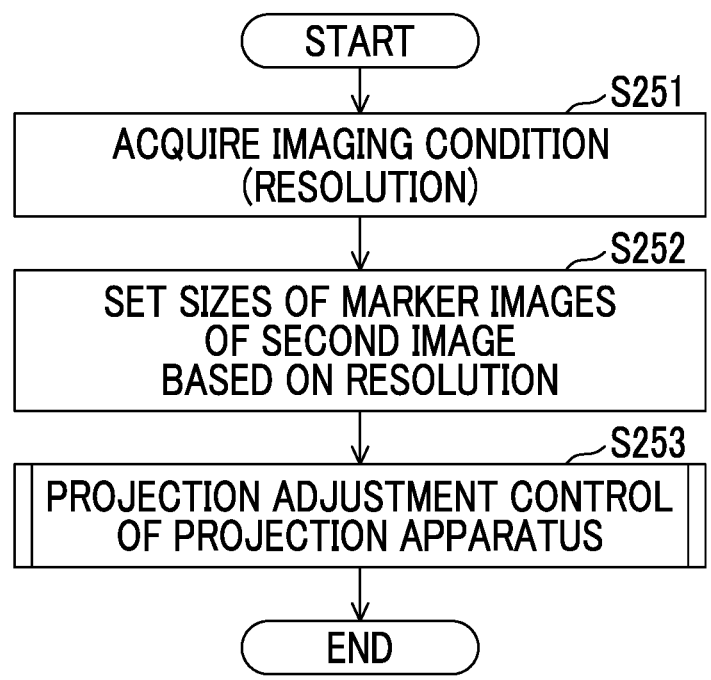
FIG. 25 is a flowchart illustrating still another example of the processing by the computer 50 based on the imaging condition.

FIG. 25 is a flowchart illustrating still another example of the processing by the computer 50 based on the imaging condition. The computer 50 may execute the processing illustrated in FIG. 25. In this example, for example, the projection apparatus 10 is the only projection apparatus that performs the projection.

First, the computer 50 acquires the imaging condition of the imaging apparatus 90 as in step S231 in FIG. 23 (step S251). Next, the computer 50 sets sizes of the marker images included in the second image based on the resolution of the imaging included in the imaging condition acquired in step S251 (step S252). For example, in a case where the resolution of the imaging is greater than or equal to the threshold value, the computer 50 sets the sizes of the marker images included in the second image to "normal". In a case where the resolution of the imaging is less than the threshold value, the computer 50 sets the sizes of the marker images of the second image to "large".

Next, the computer 50 performs the projection adjustment control of the projection apparatus 10 (step S253) and finishes the series of processing. In step S253, for example, the computer 50 adjusts the projection of the projection apparatus 10 by executing the processing illustrated in FIG. 12 on the projection apparatus 10. In a case of executing step S1206 in the processing illustrated in FIG. 12, the computer 50 generates the second images based on the sizes of the marker images set in step S252.

For example, in a case where the sizes of the marker images are set to "normal" in step S252, the computer 50 generates the second images 81 to 84 illustrated in FIG. 8 to FIG. 11 in step S1206. Meanwhile, in a case where the sizes of the marker images are set to "large" in step S252, the computer 50 generates second images including larger marker images than the second images 81 to 84 illustrated in FIG. 8 to FIG. 11 in step S1206.

Figure 26:
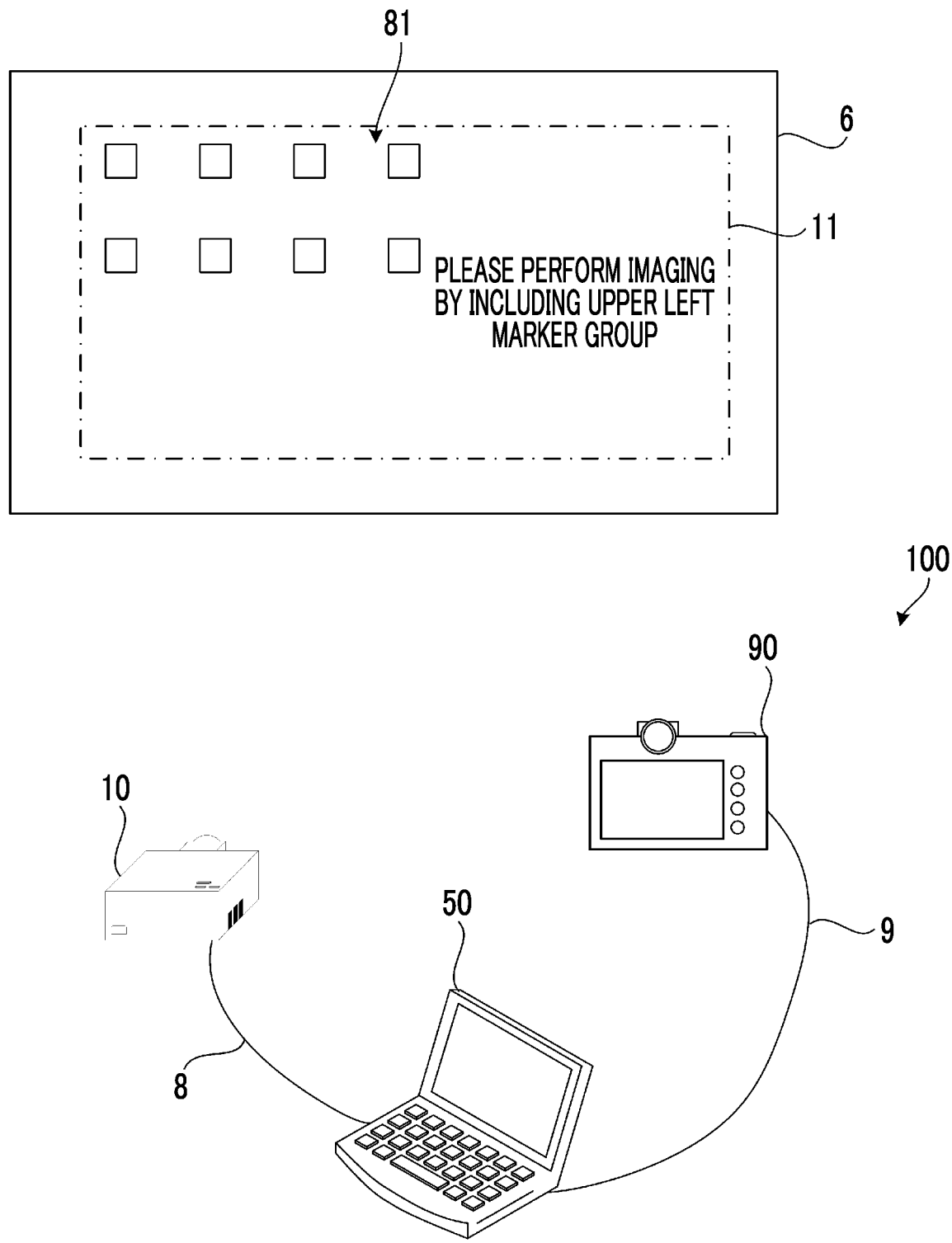
FIG. 26 is a diagram illustrating an example of marker images of the second image in a case where the resolution of the imaging of the imaging apparatus 90 is low.

Marker Images of Second Image in Case where Resolution of Imaging of Imaging Apparatus 90 is Low FIG. 26 is a diagram illustrating an example of the marker images of the second image in a case where the resolution of the imaging of the imaging apparatus 90 is low. In a case where the sizes of the marker images are set to "large" in step S252 in FIG. 25, for example, the computer 50 projects the second image 81 illustrated in FIG. 26 from the projection apparatus 10 in step S1206 of the first execution of the processing in FIG. 12.

The marker images of the second image 81 illustrated in FIG. 26 are large images, compared to the marker images of the second image 81 illustrated in FIG. 8. Accordingly, even in a case where the resolution of the imaging of the imaging apparatus 90 is low, the captured image of the second image 81 including the marker images that can be extracted with higher accuracy because the marker images are large can be obtained.

While the second image 81 projected in step S1206 of the first execution of the processing in FIG. 12 is described in FIG. 26, the computer 50 performs a control of projecting the same second image as the second image 81 illustrated in FIG. 26 from the projection apparatus 10 while changing the projection position in step S1206 of the second and later execution of the processing in FIG. 12.

As illustrated in FIG. 25 and FIG. 26, the computer 50 may perform a control of projecting the second image including the marker images having the sizes corresponding to the resolution of the imaging of the imaging apparatus 90 from the projection apparatus 10. Accordingly, even in a case where the resolution of the imaging of the imaging apparatus 90 is low, a captured image including the marker images that can be extracted with higher accuracy is obtained, and the projection of the projection apparatus 10 can be accurately adjusted.

While the control of projecting the second image including the marker images having the sizes corresponding to the resolution of the imaging in a case of performing the projection of only the projection apparatus 10 is described, a control of projecting the second image including the marker images having the sizes corresponding to the resolution of the imaging from the projection apparatuses 10 and 10A may also be performed in a case of performing the projection of the projection apparatuses 10 and 10A.

Modification Example 1

While a configuration in which the optical axis K is not bent is described as a configuration of the projection apparatus 10 in FIG. 4 and FIG. 5, the optical axis K may be configured to be bent once or more by providing a reflective member in the optical unit 106.

Figure 27:
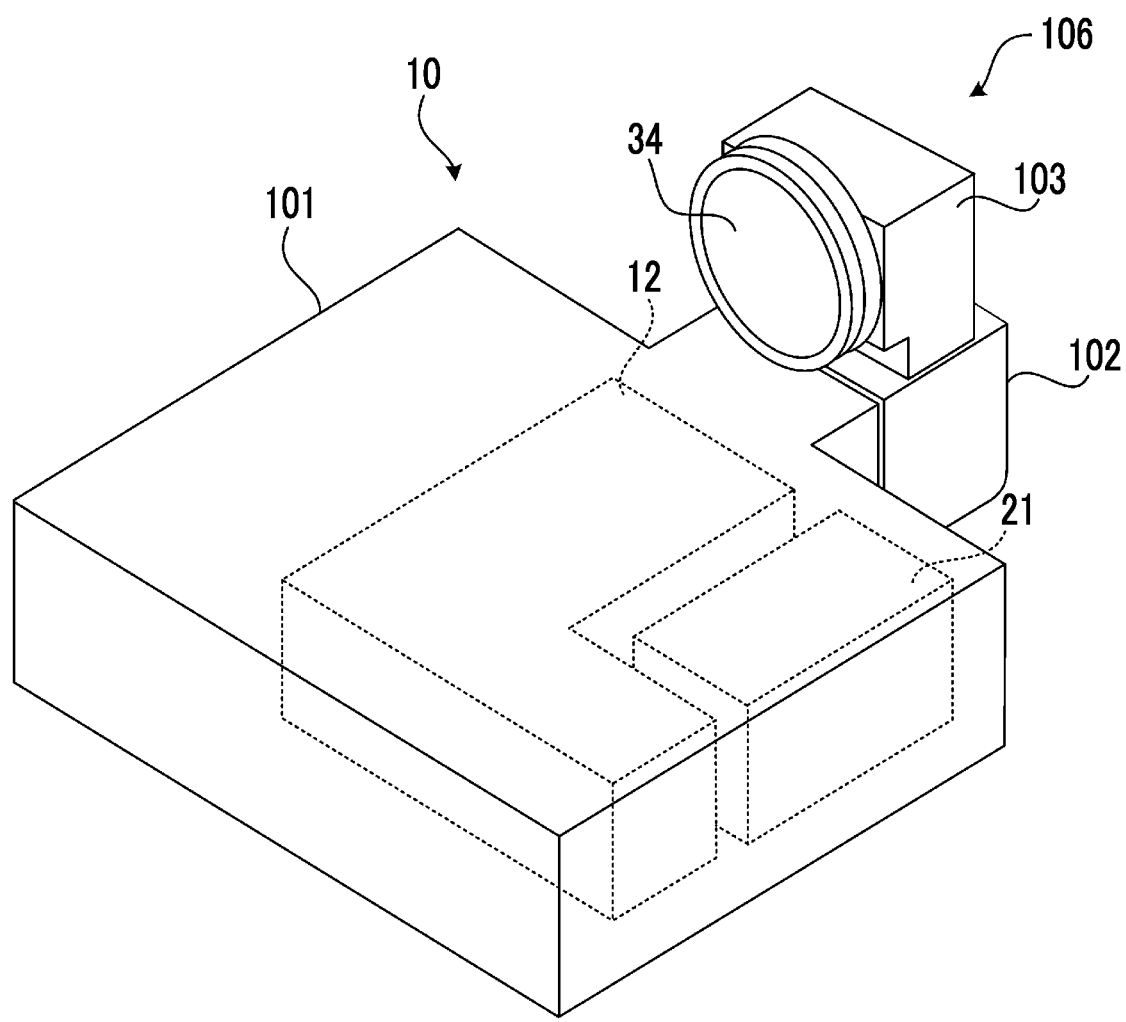
FIG. 27 is a schematic diagram illustrating another exterior configuration of the projection apparatus 10.
Figure 28:
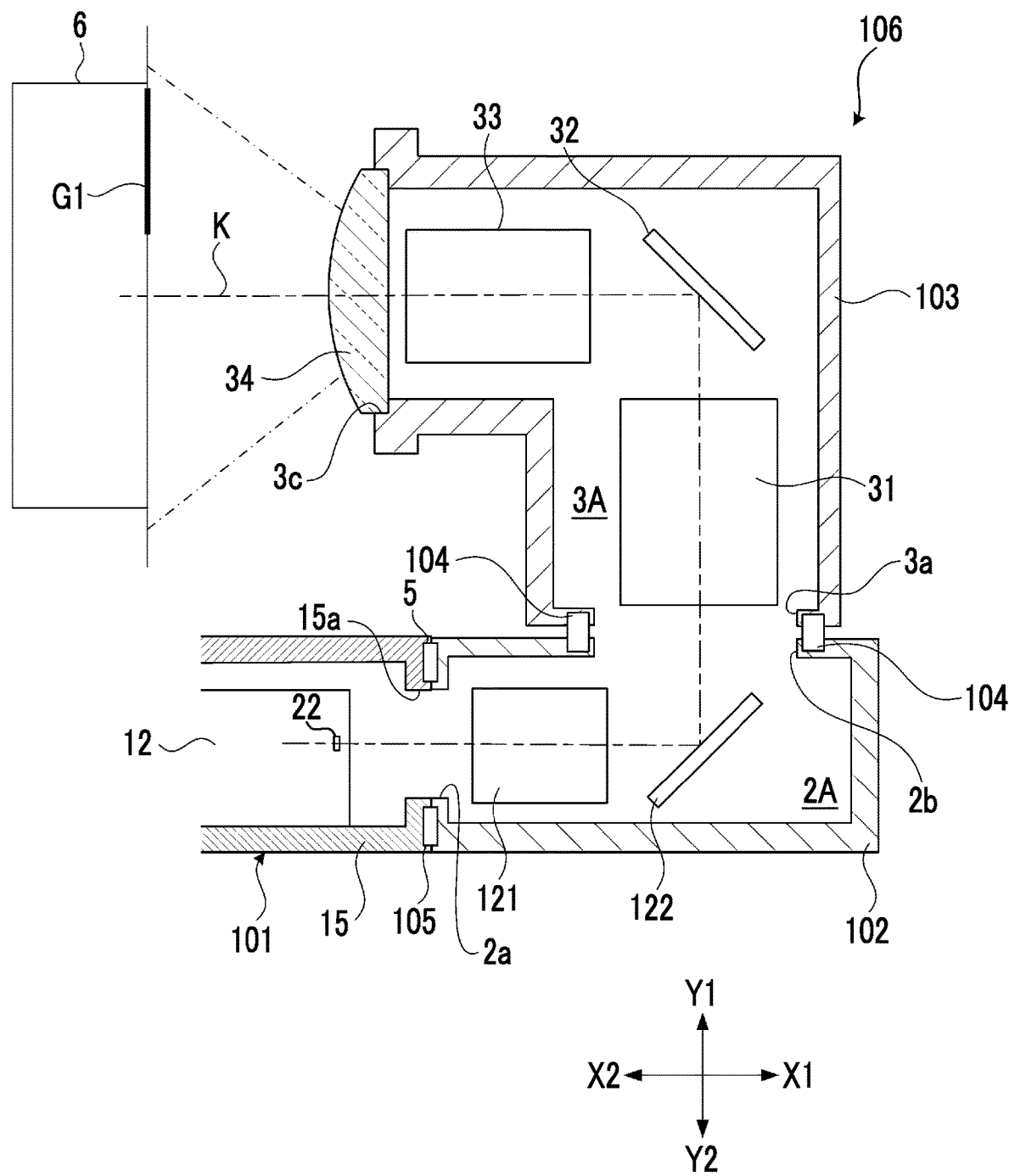
FIG. 28 is a schematic cross-sectional view of the optical unit 106 of the projection apparatus 10 illustrated in FIG. 27.

FIG. 27 is a schematic diagram illustrating another exterior configuration of the projection apparatus 10. FIG. 28 is a schematic cross-sectional view of the optical unit 106 of the projection apparatus 10 illustrated in FIG. 27. In FIG. 27 and FIG. 28, the same parts as the parts illustrated in FIG. 4 and FIG. 5 will be designated by the same reference numerals and will not be described.

As illustrated in FIG. 27, the optical unit 106 comprises a second member 103 supported by the first member 102 in addition to the first member 102 supported by the body part 101. The first member 102 and the second member 103 may be an integrated member.

As illustrated in FIG. 28, the optical unit 106 comprises, in addition to the first member 102, the second member 103 including a hollow portion 3A connected to the hollow portion 2A of the first member 102, the first optical system 121 and a reflective member 122 arranged in the hollow portion 2A, a second optical system 31, a reflective member 32, a third optical system 33, and the lens 34 arranged in the hollow portion 3A, the first shift mechanism 105, and a projection direction changing mechanism 104.

In the examples in FIG. 27 and FIG. 28, the opening 2a and the opening 2b of the first member 102 are formed in surfaces perpendicular to each other. In addition, the projection optical system 23 illustrated in FIG. 27 and FIG. 28 is composed of the reflective member 122, the second optical system 31, the reflective member 32, and the third optical system 33 in addition to the first optical system 121 and the lens 34 illustrated in FIG. 4 and FIG. 5. This projection optical system 23 forms the optical axis K to be folded by being bent twice as illustrated in FIG. 28. The first optical system 121, the reflective member 122, the second optical system 31, the reflective member 32, the third optical system 33, and the lens 34 are arranged in this order from the light modulation portion 22 side along the optical axis K.

The first optical system 121 guides the light that is incident on the first member 102 from the body part 101 and travels in the direction X1, to the reflective member 122. The reflective member 122 reflects the light incident from the first optical system 121 in the direction Y1. The reflective member 122 is configured with, for example, a mirror. In the first member 102, the opening 2b is formed on the optical path of the light reflected by the reflective member 122, and the reflected light travels to the hollow portion 3A of the second member 103 by passing through the opening 2b.

The second member 103 is a member having an approximately L-shaped cross-sectional exterior, in which an opening 3a is formed at a position facing the opening 2b of the first member 102. The light that has passed through the opening 2b of the first member 102 from the body part 101 is incident into the hollow portion 3A of the second member 103 through the opening 3a. The first member 102 and the second member 103 may have any cross-sectional exterior and are not limited to the above.

The second optical system 31 includes at least one lens and guides the light incident from the first member 102 to the reflective member 32. The reflective member 32 guides the light incident from the second optical system 31 to the third optical system 33 by reflecting the light in the direction X2. The reflective member 32 is configured with, for example, a mirror. The third optical system 33 includes at least one lens and guides the light reflected by the reflective member 32 to the lens 34.

The lens 34 is arranged in an end part of the second member 103 on the direction X2 side in the form of closing the opening 3c formed in this end part. The lens 34 projects the light incident from the third optical system 33 to the projection target object 6.

FIG. 28 illustrates a state where the first member 102 is moved as far as possible to the direction Y1 side by the first shift mechanism 105. By moving the first member 102 in the direction Y2 by the first shift mechanism 105 from the state illustrated in FIG. 28, a relative position between a center of the image formed by the light modulation portion 22 and the optical axis K changes, and the image G1 projected to the projection target object 6 can be shifted in the direction Y1.

The projection direction changing mechanism 104 is a rotation mechanism that rotatably connects the second member 103 to the first member 102. By the projection direction changing mechanism 104, the second member 103 is configured to be rotatable about a rotation axis (specifically, the optical axis K) that extends in the direction Y. The projection direction changing mechanism 104 is not limited to an arrangement position illustrated in FIG. 28 as long as the projection direction changing mechanism 104 can rotate the optical system. In addition, the number of rotation mechanisms is not limited to one, and a plurality of rotation mechanisms may be provided.

Modification Example 2

While the computer 50 is illustratively described as an example of the control device according to the embodiment of the present invention, the control device according to the embodiment of the present invention is not limited thereto. For example, the control device according to the embodiment of the present invention may be the projection apparatus 10 (or the projection apparatus 10A). In this case, each control of the computer 50 is performed by the projection apparatus 10. The projection apparatus 10 may communicate with the imaging apparatus 90 through the computer 50 or may communicate with the imaging apparatus 90 without passing through the computer 50. In a case where the projection apparatus 10 communicates with the imaging apparatus 90 without passing through the computer 50, the computer 50 may be configured to be omitted from the projection system 100.

Alternatively, the control device according to the embodiment of the present invention may be the imaging apparatus 90. In this case, each control of the computer 50 is performed by the imaging apparatus 90. The imaging apparatus 90 may communicate with the projection apparatuses 10 and 10A through the computer 50 or may communicate with the projection apparatuses 10 and 10A without passing through the computer 50. In a case where the imaging apparatus 90 communicates with the projection apparatuses 10 and 10A without passing through the computer 50, the computer 50 may be configured to be omitted from the projection system 100.

Modification Example 3

While the projection apparatuses 10 and 10A are illustratively described as an example of the plurality of projection apparatuses, the plurality of projection apparatuses may be three or more projection apparatuses.

At least the following matters are disclosed in the present specification.

(1) A control device of a projection system including one or more projection apparatuses that project a first image including a plurality of marker images, and an imaging apparatus that captures at least a part of the first image, the control device comprising a processor, in which the processor is configured to perform a control of projecting a second image including a plurality of marker images from the projection apparatus based on a capturing result of at least the part of the first image by the imaging apparatus.

(2) The control device according to (1), in which the processor is configured to perform a control of adjusting the projection of the projection apparatus based on a capturing result of the second image by the imaging apparatus.

(3) The control device according to (1) or (2), in which one or more marker images among the marker images are images associated with positions of the marker images within a projection range of the projection apparatus.

(4) The control device according to any one of (1) to (3), further comprising a correspondence table in which the marker images are associated with positions of the marker images within a projection range of the projection apparatus, in which the processor is configured to determine the positions of the marker images within the projection range of the projection apparatus based on the correspondence table.

(5) The control device according to any one of (1) to (4), in which the processor is configured to calculate an imageable range of the imaging apparatus based on the capturing result of at least the part of the first image and perform the control of projecting the second image based on the imageable range from the projection apparatus.

(6) The control device according to (5), in which the processor is configured to repeat the control of projecting the second image from the projection apparatus by generating the second image different from the first image based on the imageable range.

(7) The control device according to (6), in which the processor is configured to, in a case of repeating the control of projecting the second image from the projection apparatus, perform a control of changing a projection position of the second image.

(8) The control device according to (6) or (7), in which the processor is configured to, in a case of repeating the control of projecting the second image from the projection apparatus, perform a control of changing the second image projected from the projection apparatus.

(9) The control device according to any one of (1) to (8), in which the processor is configured to acquire an imaging condition of the imaging apparatus and perform the control of projecting the second image from the projection apparatus based on the acquired imaging condition.

(10) The control device according to (9), in which the projection apparatus includes a plurality of projection apparatuses, the imaging condition includes whether the imaging of the imaging apparatus is fixed imaging or handheld imaging, and the processor is configured to, in a case where the imaging is the fixed imaging, perform the control of projecting at least any of the first image or the second image from the plurality of projection apparatuses at different timings.

(11) The control device according to (10), in which the processor is configured to, in a case where the imaging is the handheld imaging, perform the control of projecting distinguishable images of at least any of the first image or the second image from the plurality of projection apparatuses at the same time.

(12) The control device according to any one of (9) to (11), in which the imaging condition includes a resolution of the imaging, and the processor is configured to perform the control of projecting the second image having a size corresponding to the resolution from the projection apparatus.

(13) The control device according to any one of (9) to (11), in which the imaging condition includes a resolution of the imaging, and the processor is configured to perform the control of projecting the second image including the marker images having sizes corresponding to the resolution from the projection apparatus.

(14) The control device according to any one of (1) to (13), in which the projection apparatus includes a plurality of projection apparatuses of which at least parts of projection ranges overlap, and the processor is configured to perform a control of adjusting the overlapping.

(15) The control device according to (14), in which the processor is configured to, based on a projection range of a first projection apparatus included in the plurality of projection apparatuses, perform the control of adjusting the overlapping by adjusting a projection range of a second projection apparatus that is included in the plurality of projection apparatuses and is different from the first projection apparatus.

(16) The control device according to (15), in which the processor is configured to, in a case of making the projection ranges of the plurality of projection apparatuses overlap, perform the control of adjusting the overlapping by adjusting the projection range of the second projection apparatus based on the projection range of the first projection apparatus.

(17) The control device according to (14), in which the processor is configured to perform the control of adjusting the overlapping by adjusting projection images of the plurality of projection apparatuses.

(18) The control device according to (17), in which the processor is configured to, in a case of making parts of the projection ranges of the plurality of projection apparatuses overlap, perform the control of adjusting the overlapping by adjusting the projection ranges of the plurality of projection apparatuses.

(19) A control method by a control device of a projection system including one or more projection apparatuses that project a first image including a plurality of marker images, and an imaging apparatus that captures at least a part of the first image, the control device including a processor, the control method comprising performing, by the processor, a control of projecting a second image including a plurality of marker images from the projection apparatus based on a capturing result of at least the part of the first image by the imaging apparatus.

(20) The control method according to (19), in which the processor performs a control of adjusting the projection of the projection apparatus based on a capturing result of the second image by the imaging apparatus.

(21) The control method according to (19) or (20), in which one or more marker images among the marker images are images associated with positions of the marker images within a projection range of the projection apparatus.

(22) The control method according to any one of (19) to (21), in which a correspondence table in which the marker images are associated with positions of the marker images within a projection range of the projection apparatus is further provided, and the processor determines the positions of the marker images within the projection range of the projection apparatus based on the correspondence table.

(23) The control method according to any one of (19) to (22), in which the processor calculates an imageable range of the imaging apparatus based on the capturing result of at least the part of the first image and performs the control of projecting the second image based on the imageable range from the projection apparatus.

(24) The control method according to (23), in which the processor repeats the control of projecting the second image from the projection apparatus by generating the second image different from the first image based on the imageable range.

(25) The control method according to (24), in which the processor performs, in a case of repeating the control of projecting the second image from the projection apparatus, control of changing a projection position of the second image.

(26) The control method according to (24) or (25), in which the processor performs, in a case of repeating the control of projecting the second image from the projection apparatus, a control of changing the second image projected from the projection apparatus.

(27) The control method according to any one of (19) to (26), in which the processor acquires an imaging condition of the imaging apparatus and performs the control of projecting the second image from the projection apparatus based on the acquired imaging condition.

(28) The control method according to (27), in which the projection apparatus includes a plurality of projection apparatuses, the imaging condition includes whether the imaging of the imaging apparatus is fixed imaging or handheld imaging, and the processor performs, in a case where the imaging is the fixed imaging, the control of projecting at least any of the first image or the second image from the plurality of projection apparatuses at different timings.

(29) The control method according to (28), in which the processor performs, in a case where the imaging is the handheld imaging, the control of projecting distinguishable images of at least any of the first image or the second image from the plurality of projection apparatuses at the same time.

(30) The control method according to any one of (27) to (29), in which the imaging condition includes a resolution of the imaging, and the processor performs the control of projecting the second image having a size corresponding to the resolution from the projection apparatus.

(31) The control method according to any one of (27) to (29), in which the imaging condition includes a resolution of the imaging, and the processor performs the control of projecting the second image including the marker images having sizes corresponding to the resolution from the projection apparatus.

(32) The control method according to any one of (19) to (31), in which the projection apparatus includes a plurality of projection apparatuses of which at least parts of projection ranges overlap, and the processor performs a control of adjusting the overlapping.

(33) The control method according to (32), in which the processor performs, based on a projection range of a first projection apparatus included in the plurality of projection apparatuses, the control of adjusting the overlapping by adjusting a projection range of a second projection apparatus that is included in the plurality of projection apparatuses and is different from the first projection apparatus.

(34) The control method according to (33), in which the processor performs, in a case of making the projection ranges of the plurality of projection apparatuses overlap, the control of adjusting the overlapping by adjusting the projection range of the second projection apparatus based on the projection range of the first projection apparatus.

(35) The control method according to (32), in which the processor performs the control of adjusting the overlapping by adjusting projection images of the plurality of projection apparatuses.

(36) The control method according to (35), in which the processor performs, in a case of making parts of the projection ranges of the plurality of projection apparatuses overlap, the control of adjusting the overlapping by adjusting the projection ranges of the plurality of projection apparatuses.

(37) A projection system comprising one or more projection apparatuses that project a first image including a plurality of marker images, an imaging apparatus that captures at least a part of the first image, and a control device, in which the control device includes a processor, and the processor is configured to perform a control of projecting a second image including a plurality of marker images from the projection apparatus based on a capturing result of at least the part of the first image by the imaging apparatus.

(38) A control program causing a processor of a control device of a projection system to execute a process, the projection system including one or more projection apparatuses that project a first image including a plurality of marker images, and an imaging apparatus that captures at least a part of the first image, the process comprising performing a control of projecting a second image including a plurality of marker images from the projection apparatus based on a capturing result of at least the part of the first image by the imaging apparatus.

EXPLANATION OF REFERENCES

1: projection portion
2: operation reception portion
2A, 3A: hollow portion
2a, 2b, 3a, 3c, 15a: opening
4: control portion
4a: storage medium
5: communication portion
6: projection target object
8, 8A, 9: communication cable
10, 10A: projection apparatus
11, 11A: projection range
12: light modulation unit
15: housing
21: light source
22: light modulation portion
23: projection optical system
24: control circuit
31: second optical system
32, 122: reflective member
33: third optical system
34: lens
50: computer
51: processor
52: memory
53: communication interface
54: user interface
59: bus
71, 71A: first image
72: imageable range
81 to 84: second image
90: imaging apparatus
100: projection system
101: body part
102: first member
103: second member
104: projection direction changing mechanism
105: first shift mechanism
106: optical unit
121: first optical system
G1: image

What is claimed is:

1. A control device of a projection system including one or more projection apparatuses that project a first image including a plurality of marker images, and an imaging apparatus that captures at least a part of the first image, the control device comprising:
   a processor,
   wherein the processor is configured to perform a control of projecting a second image including a plurality of marker images from the projection apparatus based on a capturing result of at least the part of the first image by the imaging apparatus.

2. The control device according to claim 1,
   wherein the processor is configured to perform a control of adjusting the projection of the projection apparatus based on a capturing result of the second image by the imaging apparatus.

3. The control device according to claim 1,
wherein one or more marker images among the marker images are images associated with positions of the marker images within a projection range of the projection apparatus.

4. The control device according to claim 1, further comprising:
a correspondence table in which the marker images are associated with positions of the marker images within a projection range of the projection apparatus,
wherein the processor is configured to determine the positions of the marker images within the projection range of the projection apparatus based on the correspondence table.

5. The control device according to claim 1,
wherein the processor is configured to calculate an imageable range of the imaging apparatus based on the capturing result of at least the part of the first image and perform the control of projecting the second image based on the imageable range from the projection apparatus.

6. The control device according to claim 5,
wherein the processor is configured to repeat the control of projecting the second image from the projection apparatus by generating the second image different from the first image based on the imageable range.

7. The control device according to claim 6,
wherein the processor is configured to, in a case of repeating the control of projecting the second image from the projection apparatus, perform a control of changing a projection position of the second image.

8. The control device according to claim 6,
wherein the processor is configured to, in a case of repeating the control of projecting the second image from the projection apparatus, perform a control of changing the second image projected from the projection apparatus.

9. The control device according to claim 1,
wherein the processor is configured to acquire an imaging condition of the imaging apparatus and perform the control of projecting the second image from the projection apparatus based on the acquired imaging condition.

10. The control device according to claim 9,
wherein the projection apparatus includes a plurality of projection apparatuses,
the imaging condition includes whether the imaging of the imaging apparatus is fixed imaging or handheld imaging, and
the processor is configured to, in a case where the imaging is the fixed imaging, perform the control of projecting at least any of the first image or the second image from the plurality of projection apparatuses at different timings.

11. The control device according to claim 10,
wherein the processor is configured to, in a case where the imaging is the handheld imaging, perform the control of projecting distinguishable images of at least any of the first image or the second image from the plurality of projection apparatuses at a same time.

12. The control device according to claim 9,
wherein the imaging condition includes a resolution of the imaging, and
the processor is configured to perform the control of projecting the second image having a size corresponding to the resolution from the projection apparatus.

13. The control device according to claim 9,
wherein the imaging condition includes a resolution of the imaging, and
the processor is configured to perform the control of projecting the second image including the marker images having sizes corresponding to the resolution from the projection apparatus.

14. The control device according to claim 1
wherein the projection apparatus includes a plurality of projection apparatuses of which at least parts of projection ranges overlap, and
the processor is configured to perform a control of adjusting the overlapping.

15. The control device according to claim 14,
wherein the processor is configured to, based on a projection range of a first projection apparatus included in the plurality of projection apparatuses, perform the control of adjusting the overlapping by adjusting a projection range of a second projection apparatus that is included in the plurality of projection apparatuses and is different from the first projection apparatus.

16. The control device according to claim 15,
wherein the processor is configured to, in a case of making the projection ranges of the plurality of projection apparatuses overlap, perform the control of adjusting the overlapping by adjusting the projection range of the second projection apparatus based on the projection range of the first projection apparatus.

17. The control device according to claim 14,
wherein the processor is configured to perform the control of adjusting the overlapping by adjusting projection images of the plurality of projection apparatuses.

18. The control device according to claim 17,
wherein the processor is configured to, in a case of making parts of the projection ranges of the plurality of projection apparatuses overlap, perform the control of adjusting the overlapping by adjusting the projection ranges of the plurality of projection apparatuses.

19. A control method by a control device of a projection system including one or more projection apparatuses that project a first image including a plurality of marker images, and an imaging apparatus that captures at least a part of the first image, the control device including a processor, the control method comprising:
performing, by the processor, a control of projecting a second image including a plurality of marker images from the projection apparatus based on a capturing result of at least the part of the first image by the imaging apparatus.

20. A projection system comprising:
one or more projection apparatuses that project a first image including a plurality of marker images;
an imaging apparatus that captures at least a part of the first image; and
a control device,
wherein the control device includes a processor, and
the processor is configured to perform a control of projecting a second image including a plurality of marker images from the projection apparatus based on a capturing result of at least the part of the first image by the imaging apparatus.

21. A non-transitory computer readable medium storing a control program causing a processor of a control device of a projection system to execute a process, the projection system including one or more projection apparatuses that project a first image including a plurality of marker images, and an imaging apparatus that captures at least a part of the first image, the process comprising:

performing a control of projecting a second image including a plurality of marker images from the projection apparatus based on a capturing result of at least the part of the first image by the imaging apparatus.

\* \* \* \* \*